(12) United States Patent
Ando et al.

(10) Patent No.: US 10,559,426 B2
(45) Date of Patent: Feb. 11, 2020

(54) ELECTRONIC DEVICE HAVING CERAMIC ELEMENT BODY AND EXTERNAL TERMINAL

(71) Applicant: TDK CORPORATION, Tokyo (JP)

(72) Inventors: Norihisa Ando, Tokyo (JP); Sunao Masuda, Tokyo (JP); Masahiro Mori, Tokyo (JP); Kayou Matsunaga, Tokyo (JP); Kosuke Yazawa, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 15/938,561

(22) Filed: Mar. 28, 2018

(65) Prior Publication Data

US 2018/0294100 A1 Oct. 11, 2018

(30) Foreign Application Priority Data

Mar. 31, 2017 (JP) .................. 2017-073105

(51) Int. Cl.
 *H01G 4/232* (2006.01)
 *H01G 4/30* (2006.01)
 *H01G 2/06* (2006.01)
 *H01G 4/12* (2006.01)

(52) U.S. Cl.
 CPC .......... *H01G 4/2325* (2013.01); *H01G 2/06* (2013.01); *H01G 4/30* (2013.01); *H01G 4/12* (2013.01)

(58) Field of Classification Search
 CPC .......... H01G 2/06; H01G 4/248; H01G 4/232; H01G 4/30
 See application file for complete search history.

(56) References Cited

U.S. PATENT DOCUMENTS

| 6,046,902 | A | * | 4/2000 | Nakagawa | H01G 4/228 361/306.1 |
| 6,081,416 | A | * | 6/2000 | Trinh | H01G 4/12 361/308.1 |
| 6,191,933 | B1 | * | 2/2001 | Ishigaki | H01G 4/232 361/309 |
| 6,288,887 | B1 | | 9/2001 | Yoshida et al. | |
| 6,515,844 | B1 | * | 2/2003 | Moriwaki | H01C 1/028 361/301.4 |
| 10,096,426 | B2 | * | 10/2018 | Masuda | H01G 4/232 |
| 2009/0296311 | A1 | * | 12/2009 | Otsuka | H01G 2/065 361/306.3 |

(Continued)

FOREIGN PATENT DOCUMENTS

CN 103714971 A 4/2014
DE 102015102866 A1 * 9/2016 ............... H01G 4/38

(Continued)

*Primary Examiner* — David M Sinclair
(74) *Attorney, Agent, or Firm* — Oliff PLC

(57) ABSTRACT

An electronic device includes a chip component and an external terminal. The chip component includes a terminal electrode formed on an end surface of a ceramic element body containing an internal electrode. The external terminal includes a first end electrically connected with the terminal electrode and a second end disposed opposite to the first end and connected with a mounting surface. The external terminal includes a first metal and a second metal different from the first metal. The first metal and the second metal are alternately exposed on a surface of the external terminal.

13 Claims, 16 Drawing Sheets

(56) References Cited

U.S. PATENT DOCUMENTS

| | | | | |
|---|---|---|---|---|
| 2014/0118882 A1* | 5/2014 | Masuda | ................... | H01G 4/30 |
| | | | | 361/321.2 |
| 2014/0345927 A1* | 11/2014 | Itagaki | ................... | H01G 2/065 |
| | | | | 174/260 |
| 2017/0186539 A1* | 6/2017 | Masuda | ................. | H01G 4/232 |
| 2018/0047507 A1* | 2/2018 | Koini | ....................... | H01G 4/38 |

FOREIGN PATENT DOCUMENTS

| JP | 02161711 A * | 6/1990 |
|---|---|---|
| JP | 2000-235932 A | 8/2000 |
| JP | 2014-146642 A | 8/2014 |

\* cited by examiner

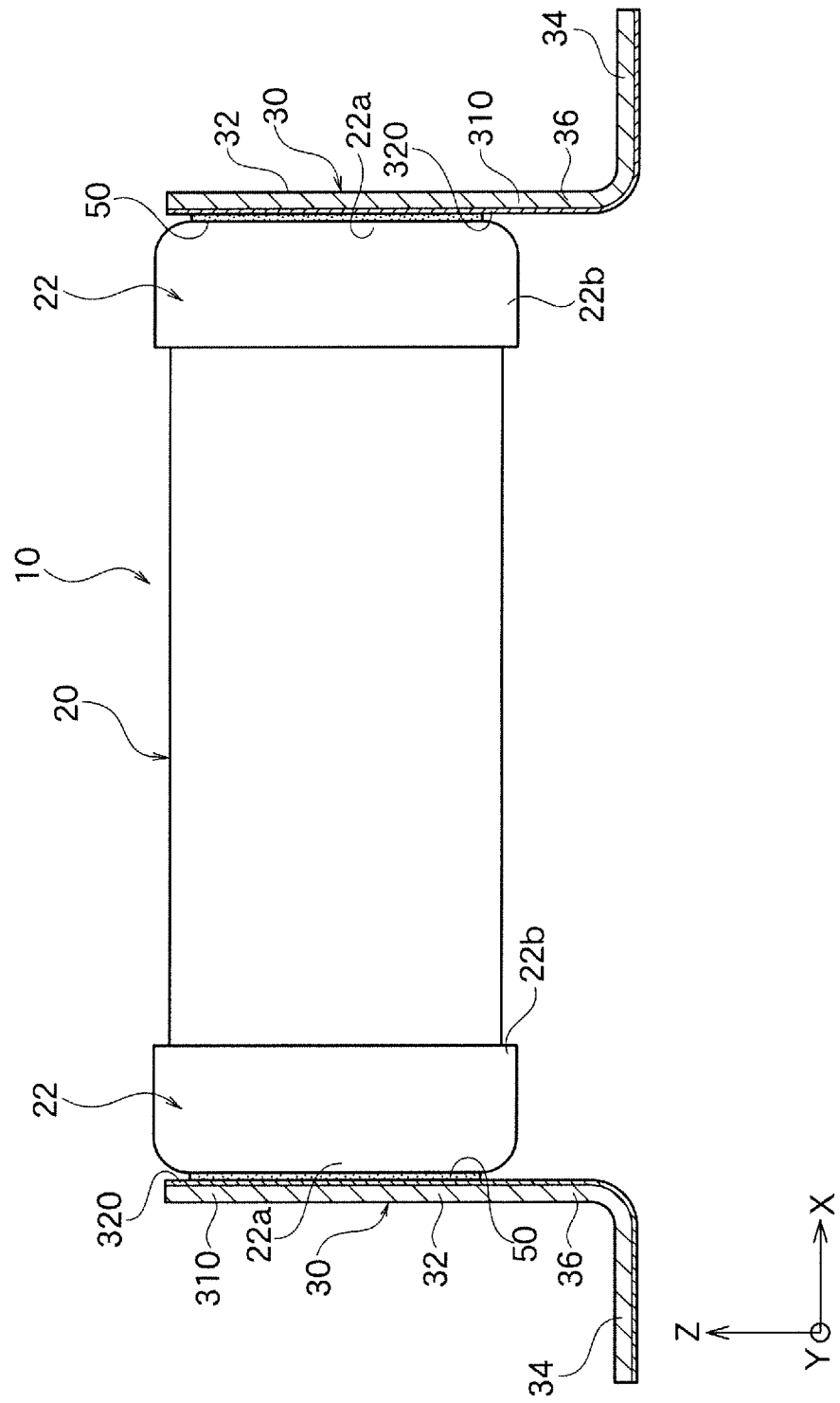

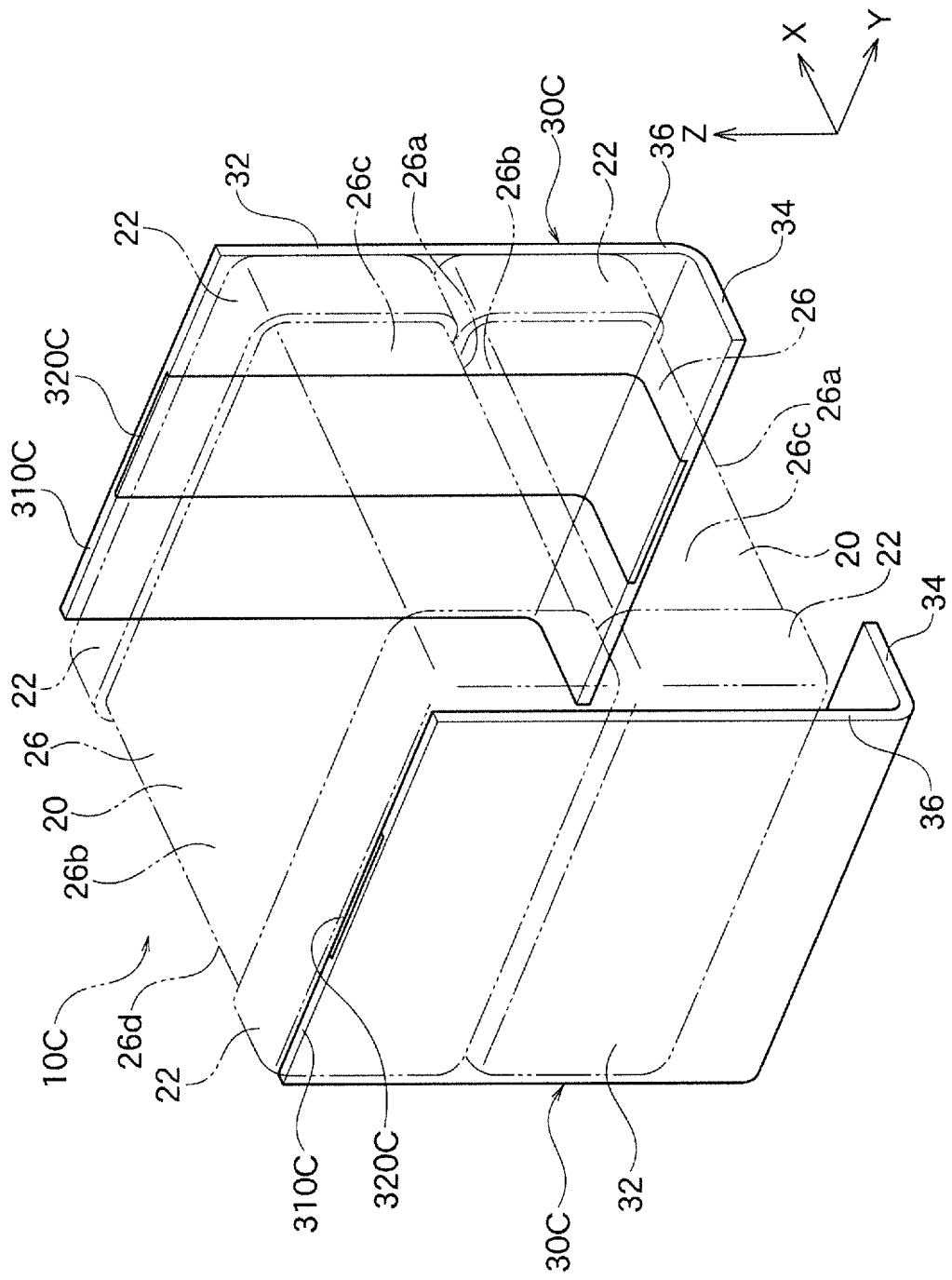

ELECTRONIC DEVICE HAVING CERAMIC ELEMENT BODY AND EXTERNAL TERMINAL

BACKGROUND OF THE INVENTION

1. Field of the Invention

The present invention relates to an electronic device to which external terminals consisting of metal terminals are connected, for example.

2. Description of the Related Art

In addition to an ordinary chip component directly surface-mounted on a board or so by itself, a chip component to which an external terminal such as a metal terminal is attached is proposed as an electronic device having a ceramic element body such as a ceramic capacitor. It is reported that an electronic device to which an external terminal is attached relaxes a deformation stress received by a chip component from a board and protects the chip component from impact or so after the electronic device is mounted. This electronic device is used in fields requiring durability, reliability, and the like.

In the electronic device with the external terminal, one end of the external terminal is connected to a terminal electrode of the chip component, and the other end is connected to a mounting surface such as a circuit board by solder or so. For example, Patent Document 1 discloses an external terminal formed by combining various metals of Cu, Fe, etc. In the electronic device of Patent Document 1 with the external terminal, current capacity can be secured while a necessary mechanical strength is maintained.

In the electric device of Patent Document 1, however, the connection part between the terminal electrode of the chip device and the external terminal has an insufficient reliability, equivalent series resistance (ESR) is increased, or acoustic noise deteriorates due to electrostrictive phenomenon of the electronic device, depending on arrangement of each metal.

Patent Document 1: JP 2000-235932 A

SUMMARY OF THE INVENTION

The prevent invention has been achieved under such circumstances. It is an object of the invention to provide an electronic device capable of securing a reliability of a connection part between a terminal electrode and an external terminal with simple structure and capable of reducing ESR or preventing acoustic noise.

To achieve the above object, an electronic device according to the present invention comprises:

a chip component including a terminal electrode on an end surface of a ceramic element body containing an internal electrode; and an external terminal including a first end electrically connected with the terminal electrode and a second end disposed opposite to the first end and connected with a mounting surface, wherein the external terminal comprises:

a first metal; and a second metal different from the first metal, and wherein the first metal and the second metal are alternately exposed on a surface of the external terminal.

In the electronic device according to the present invention, the external terminal includes the first metal and the second metal, and the first metal and the second metal are alternately exposed on the surface of the external terminal. In such a structure, the present inventors have found that the reliability of the connection part between the terminal electrode and the external terminal can be secured, and that ESR can be reduced or acoustic noise can be prevented. Then, the present inventors have achieved the present invention.

For example, when the first metal is a metal whose thermal expansion coefficient is smaller than a thermal expansion coefficient of the second metal, a stress at a connection part between the terminal electrode and the metal terminal (e.g. connection part by solder) is reduced, and the reliability (or durability) of this connection part can be secured, compared to when the external terminal is formed by only the second metal. In addition, the reliability, such as thermal impact, is improved.

For example, when the second metal is a metal whose electric resistance is smaller than an electric resistance of the first metal, ESR of the electronic device can be improved, compared to when the metal terminal is formed by only the first metal. In this case, the second metal contributes to improvement on ESR of the electronic device.

Moreover, when the second metal has a spring constant (vertical elastic coefficient) that is smaller than a spring constant (vertical elastic coefficient) of the first metal, the second metal has an improved vibration absorption effect, a vibration transmitted from the ceramic element body to the mounting surface or a vibration transmitted reversely from the mounting surface to the ceramic element body can be attenuated in the second metal, and acoustic noise can be prevented.

Preferably, the first metal and the second metal are alternately exposed on a surface facing the end surface of the ceramic element body. In such a structure, both of the first metal and the second metal can be connected with the terminal electrode, and the above-mentioned effects are improved.

Preferably, the second metal extends in a direction from the first end to the second end of the external terminal. In such a structure, an electric path of the second metal is formed from the first end of the metal terminal (near the terminal electrode) to the second end of the metal terminal (near the mounting surface). Thus, when the second metal is a metal whose electric resistance is smaller than an electric resistance of the first metal, the terminal electrode and the mounting surface are connected by the electric path with a small electric resistance. As a result, ESR of the electronic device can be reduced effectively, compared to when the external terminal is formed only by the first metal.

The second metal may extend in a perpendicular direction to a direction from the first end to the second end of the external terminal. In such a structure, the second metal is disposed to cross the path from the first end to the second end. Thus, a vibration transmitted from the capacitor element body to the mounting surface or a vibration transmitted reversely from the mounting surface to the capacitor element body inevitably goes through the second metal. Thus, when the second metal has a spring constant that is smaller than a spring constant of the first metal, the second metal has an improved vibration absorption effect, the vibrations can be attenuated in the second metal, and acoustic noise can be prevented effectively.

Preferably, the terminal electrode is connected with at least the first metal of the external terminal. In such a structure, when the first metal is a metal whose thermal expansion coefficient is smaller than a thermal expansion coefficient of the second metal, the reliability of the connection part between the external terminal and the terminal electrode can be secured sufficiently, compared to when the external terminal is formed only by the second metal.

Preferably, an electric resistance of the second metal is lower than that of the first metal. In such a structure, ESR of the electronic device can be improved effectively.

Preferably, a spring constant of the second metal is lower than that of the first metal. In such a structure, the second metal has a vibration absorption effect that is higher than a vibration absorption effect of the first metal, a vibration transmitted from the ceramic element body to the mounting surface or a vibration transmitted reversely from the mounting surface to the capacitor element body can be attenuated in the second metal, and acoustic noise can be prevented effectively.

The external terminal may comprise a terminal electrode connection part disposed to face the terminal electrode, and a mount connection part connectable with the mounting surface. The first metal and the second metal may be formed over the terminal electrode connection part and the mount connection part.

The first metal may be an iron-based metal, and the second metal may be a copper-based metal. A thermal expansion coefficient of iron-based metals is smaller than that of copper-based metals. A copper-based metal may have an electric resistance that is smaller than an electric resistance of an iron-based metal and may have a vibration absorption effect that is higher than a vibration absorption effect of an iron-based metal. In the present invention, the conception of metals includes alloys.

BRIEF DESCRIPTION OF THE DRAWINGS

FIG. 3B is a schematic cross-sectional view of a main part of a modified example of the electronic device shown in FIG. 1.

FIG. 6A is a perspective view of an electronic device according to further another embodiment of the present invention.

DESCRIPTION OF THE PREFERRED EMBODIMENTS

Hereinafter, the present invention is described based on embodiments shown in the figures.

(First Embodiment)

Figure 1:
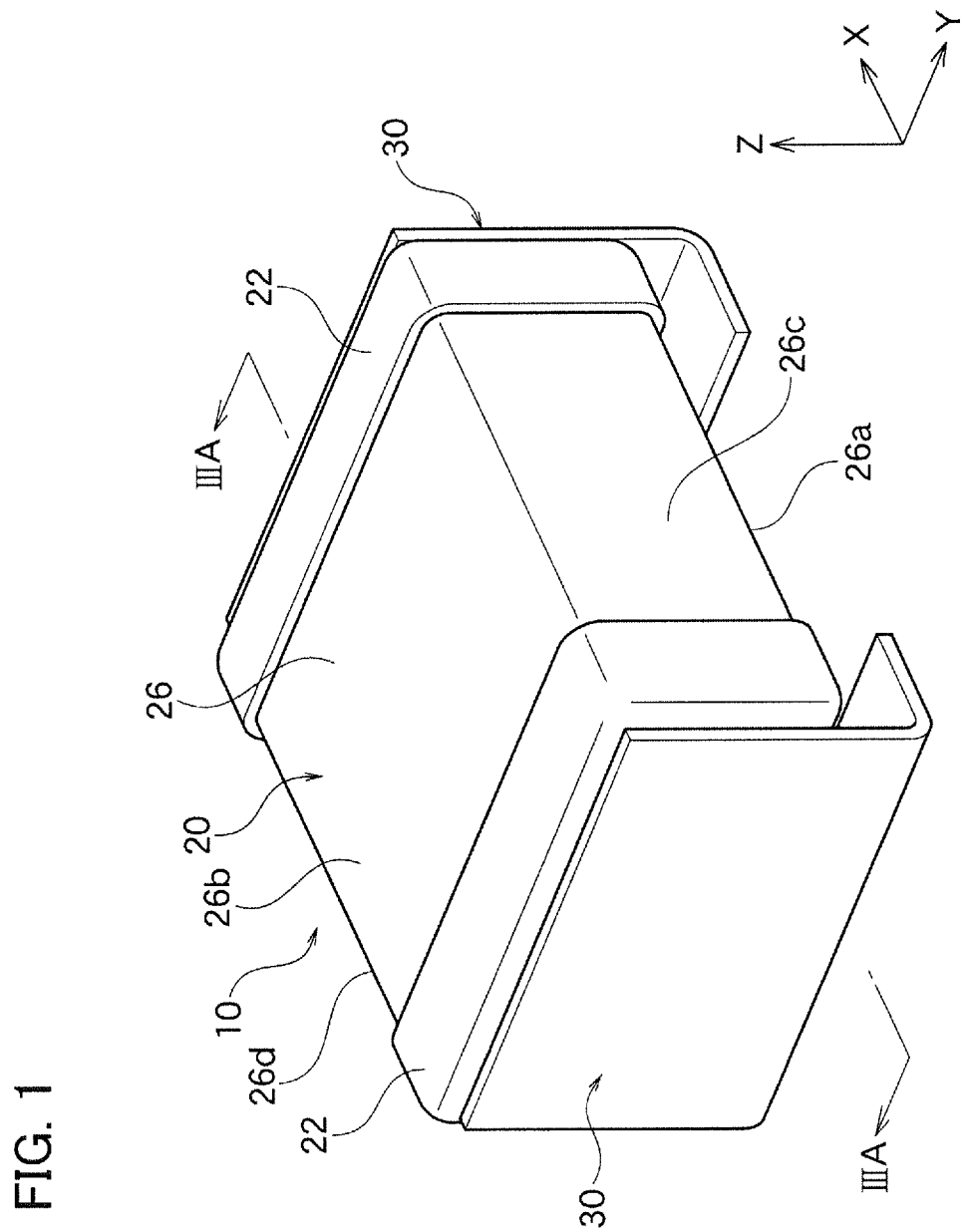
FIG. 1 is a perspective view of an electronic device according to First Embodiment of the present invention.

FIG. 1 is a schematic cross-sectional view showing an electronic device 10 according to First Embodiment of the present invention. The electronic device 10 has a chip capacitor 20 as a chip component and a pair of metal terminals (external terminals) 30 respectively attached on both end surfaces of the chip capacitor 20 in the X-axis direction.

Incidentally, each embodiment is explained based on an electronic device where a pair of metal terminals 30 is attached on the chip capacitor 20, but the present invention is not limited to this electronic device, and may be an electronic device where the metal terminals 30 are attached to a chip component other than a capacitor.

Figure 3A:
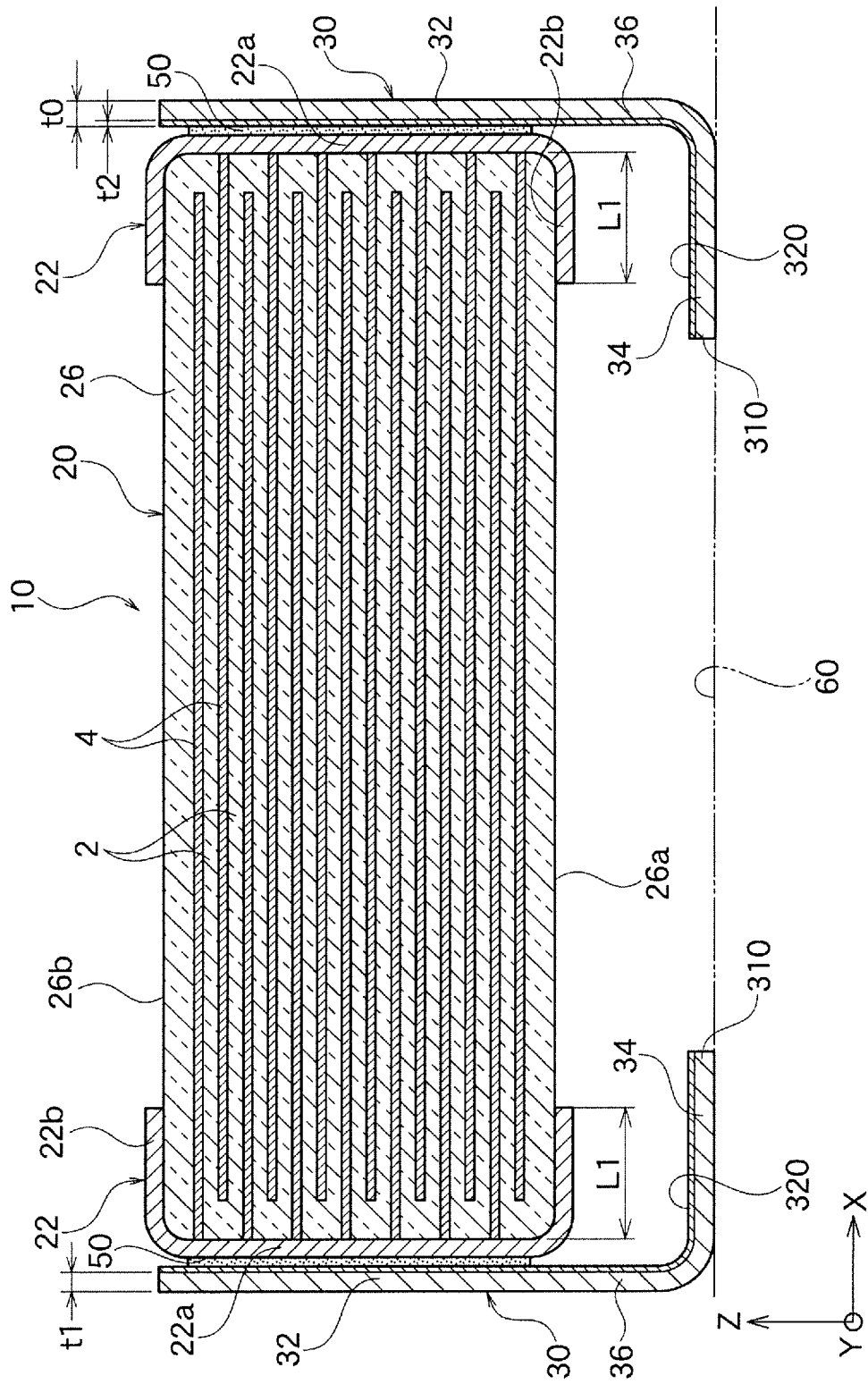
FIG. 3A is a cross-sectional view along the IIIA-IIIA line of the electronic device shown in FIG. 1.

The chip capacitor 20 has a capacitor element body (ceramic element body) 26 and a pair of terminal electrodes 22 respectively formed on both end surfaces of the capacitor element body 26 in the X-axis direction. The capacitor element body 26 has four side surfaces 26a, 26b, 26c, and 26d, all of which are approximately vertical to the end surfaces in the X-axis direction. As shown in FIG. 3A, the bottom side surface 26a of the side surfaces is a bottom side surface closest to a mounting surface 60 of a circuit board. In the present embodiment, the side surface 26b opposing to the bottom side surface 26a in parallel is a top side surface. The other side surfaces 26c and 26d are arranged approximately vertically to the mounting surface 60.

In the respective figures, the X-axis, the Y-axis, and the Z-axis are vertical to each other, and the Z-axis is a vertical direction to the mounting surface 60, the X-axis is a vertical direction to the end surfaces of the element body 26, and the Y-axis is a vertical direction to the side surfaces 26c and 26d.

As shown in FIG. 3A, the capacitor element body 26 contains dielectric layers 2 as ceramic layers and internal electrode layers 4, and the dielectric layers 2 and the internal electrode layers 4 are laminated alternately. One of adjacent internal electrode layers 4 is connected to one of the terminal electrodes 22 opposing to each other in the X-axis direction. In FIG. 3A, the dielectric layers 2 and the internal electrode layers 4 are laminated alternately in the Z-axis direction, but may be laminated alternately in the Y-axis direction. The lamination direction is not limited.

The dielectric layer 2 is made by any material, and is constituted by a dielectric materials, such as calcium titanate, strontium titanate, barium titanate, and mixture of these. Each of the dielectric layers 2 has any thickness, but normally has a thickness of one tenth of several μm to tens of μm.

The internal electrode layer contains any conductive material, and may contain a comparatively cheap base metal if the dielectric layer is composed of a reduction resistant material. Preferably, the base material is Ni or Ni alloy. The Ni alloy is preferably an alloy of Ni and one or more elements selected from Mn, Cr, Co, and Al, and preferably contains 95 wt % or more of Ni. Incidentally, Ni or the Ni alloy may contain about 0.1 wt % or less of various kinds of fine components, such as P. The internal electrode layers may be formed using a commercially available paste for electrodes. The internal electrodes may have any thickness appropriately determined depending upon usage or so.

The terminal electrode 22 is also made by any material, and is normally made by copper, copper alloy, nickel, nickel alloy, or the like, but may be made by silver, an alloy of silver and palladium, or the like. The thickness of the terminal electrode 22 is not limited either, but is normally about 10 to 50 μm. Incidentally, at least one metal cover film of Ni, Cu, Sn etc. may be formed on the surfaces of the terminal electrodes 22. In particular, the metal cover film is preferably a multilayer structure of Cu baked layer/Ni plating layer/Sn plating layer.

In the present embodiment, the terminal electrode 22 may be constituted by multilayer electrode films having at least a resin electrode layer. For example, the terminal electrode 22 having a resin electrode layer preferably consists of baked layer/resin electrode layer/Ni plating layer/Sn plating layer from the contacting side against the element body 26.

As shown in FIG. 3A, the terminal electrodes 22 have end-surface electrode parts 22a and side-surface electrode parts 22b. The end-surface electrode parts 22a are positioned respectively on both end surfaces of the element body 26 in the X-axis direction so as to cover the end surfaces. The side-surface electrode parts 22b are formed integrally with the end-surface electrode parts 22a so as to cover the element body 26 from the end surfaces to a plurality of side surfaces 26a to 26d near the end surfaces with a predetermined cover width L1. In the present embodiment, the side-surface electrode parts 22b may not substantially be formed, and the terminal electrodes 22 may substantially consist of only the end-surface electrode parts 22a.

As shown in FIG. 3A, each of the metal terminals 30 has a terminal electrode connection part (first end) 32 and a mount connection part (second end) 34. The terminal electrode connection part 32 is disposed to face the end-surface electrode part 22a of the terminal electrode 22 formed on the end surface of the element body 26 in the X-axis direction. The mount connection part 34 is connectable with the mounting surface 60. That is, the first end of each metal terminal 30 is electrically connected with the terminal electrode 22, and the second end of each metal terminal 30 is connected with the mounting surface 60.

As shown in FIG. 3A, the terminal electrode connection part 32 and the mount connection part 34 are coupled with each other by a coupled part 36 formed therebetween so that the bottom surface 26a of the element body 26 closest to the mounting surface 60 is separated from the mounting surface 60 with a predetermined distance.

The coupled part 36 has a bent shape (L shape) from the terminal electrode connection part 32 to the bottom surface 26a (inward) so that the mount connection part 34 faces the bottom surface 26a with a predetermined distance. As a modified example of the present embodiment, however, the mount connection part 34 may be bent from the terminal electrode connection part 32 in the opposite direction (outward) to the bottom surface 26a, as shown in FIG. 3B.

Figure 2:
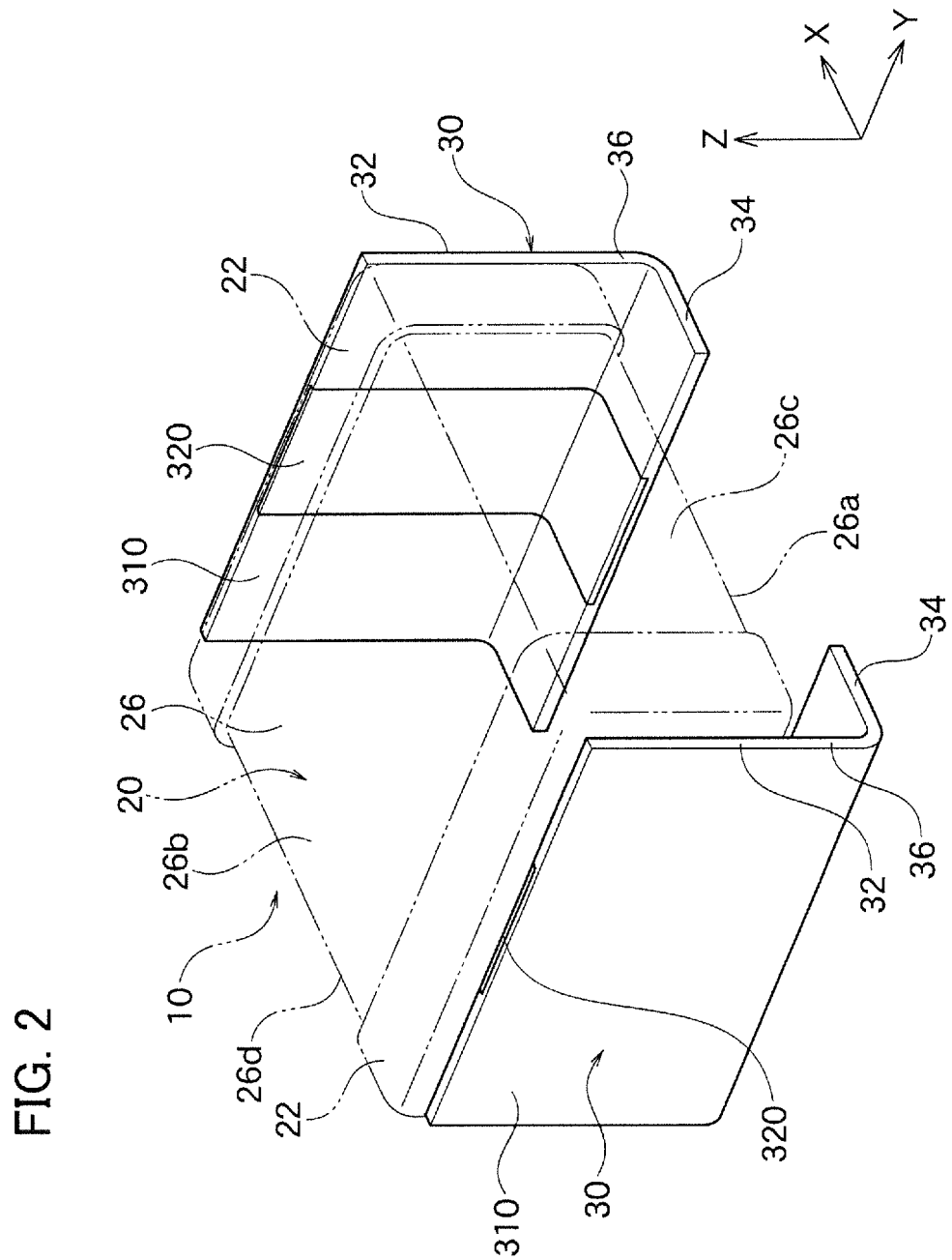
FIG. 2 is another perspective view of the electronic device shown in FIG. 1.

As shown in FIG. 3A, each of the metal terminals 30 has a cross section of an approximately L shape, and is formed from a clad material where a first metal 310 and a second metal 320, which are different metals, are connected and arranged next to each other in the surface direction. In the present embodiment, as shown in FIG. 2, each of the metal terminals 30 has the first metal 310 and the second metal 320 different therefrom, and the first metal 310 and the second metal 320 are alternately exposed on a surface of the metal terminal 30 facing the end surface (end-surface electrode part 22a) of the capacitor element body 26.

Incidentally, only the first metal 310 is exposed on the surface of the metal terminal 30 opposite to the surface facing the end surface of the capacitor element body 26. A metal cover film may be formed by plating on the surface of the metal terminal 30.

The second metal 320 is formed from a strip of metal, and is disposed to be embedded in the central part of the first metal 310 in the Y-axis direction based on the following method. A two-layer lamination structure of the second metal 320 and the first metal 310 disposed outside the second metal 320 in the X-axis direction is formed on the central part of the metal terminal 30 in the Y-axis direction. A three-layer lamination structure where the first metal 310, the second metal 320, and the first metal 310 are arranged in this order in the Y-axis direction is formed on the inner surface (closed to the element body) of each metal terminal 30 in the X-axis direction.

The second metal 320 extends from the terminal electrode connection part 32 of the metal terminal 30 toward the mount connection part 34. For more detail, as shown in FIG. 2, the second metal 320 is formed over the terminal electrode connection part 32 and the mount connection part 34 along the L shape of the metal terminal 30. In the present embodiment, when the terminal electrode connection part 32 is connected with the end-surface electrode part 22a shown in FIG. 3A, both of the first metal 310 and the second metal 320 are connected (joined) with the end-surface electrode part 22a by a solder 50.

The width of the metal terminal 30 (width in the Y-axis direction) is approximately the same as that of the end-surface electrode part 22a. In FIG. 2, the width of the second metal 320 is approximately ⅓ of the width of the end-surface electrode part 22a, but the width of the second metal 320 is not limited and may be 1/10 to 9/10 of the width of the end-surface electrode part 22a. In the example of FIG. 2, the width of the second metal 320 in the Z-axis direction is equal to the width of the first metal 310 in the Z-axis direction in the terminal electrode connection part 32, but the width of the second metal 320 in the Z-axis direction may be smaller than the width of the first metal 310 in the Z-axis direction in the terminal electrode connection part 32. In the example of FIG. 2, the width of the second metal 320 in the X-axis direction is equal to the width of the first metal 310 in the X-axis direction in the mount connection part 34, but the width of the second metal 320 in the X-axis direction may be smaller than the width of the first metal 310 in the X-axis direction in the mount connection part 34.

In the present embodiment, the first metal 310 is an iron-based metal having a small thermal expansion coefficient. In the present embodiment, the first metal 310 has a thermal expansion coefficient that is smaller than a thermal expansion coefficient of the second metal 320 and is also smaller a thermal expansion coefficient of the capacitor element body 26. Preferably, the difference in thermal expansion coefficient between the first metal 310 and the capacitor element body 26 is 0.5 ppm or more.

Specifically, the first metal 310 is preferably an iron-based alloy of 42Ni—Fe, 36Ni—Fe, 52Ni—Fe, 50Ni—Fe, 30Ni—Fe, 32Ni-5Co—Fe, 29Ni-16Co—Fe, or the like. The iron-based alloy has a thermal expansion coefficient that is smaller than a thermal expansion coefficient of the capacitor element body 26. The first metal 310 is not limited to the iron-based alloy as long as the first metal 310 has a thermal expansion coefficient that is smaller than a thermal expansion coefficient of the capacitor element body 26, and the first metal 310 may be SUS410, SUS430, Ni, or the like.

For more detail, the first metal 310 is preferably a metal having a thermal expansion coefficient of 3 to 11, the second metal 320 is preferably a metal (Cu-based metal) having a thermal expansion coefficient of 17 to 19, and the capacitor element body 26 is preferably a capacitor element body having a thermal expansion coefficient of 9 to 11.

In the present embodiment, the second metal 320 is a copper-based metal. The second metal 320 is a metal having a small electric resistance (i.e. high conductivity). In the present embodiment, the second metal 320 has an electric resistance that is smaller than an electric resistance of the first metal 310. Incidentally, the first metal 310 preferably has an electric resistance of $(5 \text{ to } 100) \times 10^{-8}$ $\Omega \cdot m$ by volume resistivity. For example, the difference in electric resistance between the first metal 310 and the second metal 320 is preferably $3 \times 10^{-8}$ $\Omega \cdot m$ or more.

The second metal 320 is a metal having a small (soft) spring constant (vertical elastic coefficient). In the present embodiment, the second metal 320 has a spring constant that is smaller than a spring constant of the first metal 310, and the second metal 320 has a vibration absorption effect.

More specifically, the second metal 320 is a metal (non-ferrous metal) of copper, copper alloy, aluminum, aluminum alloy, zinc, zinc alloy, or the like. This metal has an electric resistance that is smaller than an electric resistance of the first metal 310 mentioned above.

As a favorable combination, the second metal 320 is copper or copper alloy, and the first metal 310 is 42Ni—Fe or 36Ni—Fe. The metal terminal 30 having the first metal 310 and the second metal 320 has any total thickness t0 (see FIG. 3A), but preferably has a total thickness t0 of 0.05 to 0.2 mm. The total thickness t0 corresponds to a thickness of the first metal 310 itself in a part where the second metal 320 is not laminated.

Preferably, the first metal 310 has a thickness t1 of at least 20 μm in a part where the second metal 320 is laminated. In this part, the maximum of the thickness t1 of the first metal 310 is determined based on balance with the total thickness t0, and is determined so that t1/t0 is preferably 9/10 or less, more preferably 8/10 or less.

The thickness t2 of the second metal 320 may be smaller or larger than the thickness t1 of the first metal 310, and is preferably at least 10 μm. The maximum of the thickness t2 of the second metal 320 is determined based on balance with the total thickness t0, and is determined so that t2/t0 is preferably 9/10 or less, more preferably 8/10 or less.

In the above-mentioned structure, a stress at a connection part of the external terminal (e.g., at a connection part by the solder 50) is further reduced, ESR is further improved, and acoustic noise is further prevented.

The shape and size of the chip capacitor 20 are appropriately determined depending upon object and usage. When the chip capacitor 20 has a rectangular-parallelepiped shape, the size of the chip capacitor 20 is normally approximately length (0.6 to 7.5 mm) ×width (0.3 to 6.3 mm) ×thickness (0.1 to 3.2 mm).

Method of Manufacturing Electronic Device 10

Hereinafter, a method of manufacturing the electronic device 10 is described. First, the chip capacitor 20 is manufactured. A paint for green sheet is prepared so as to form a green sheet to be a dielectric layer after being fired. In the present embodiment, the paint for green sheet is composed of an organic solvent based paste obtained by kneading a raw material of a dielectric material and an organic vehicle, or is composed of an aqueous paste.

The raw material of the dielectric material is appropriately selected from various kinds of compounds to be calcium titanate, strontium titanate, or barium titanate after being fired, such as carbonate, nitrate, hydroxide, and organic metal compound, and these may be mixed and used.

Next, a green sheet is formed on a carrier sheet using the above-mentioned green sheet paste. Then, an electrode pattern to be an internal electrode layer after being fired is formed on one of the surfaces of the green sheet. The electrode pattern is formed by any method, such as a printing method, a transfer method, and a thin film method. The electrode pattern is formed on the green sheet and is thereafter dried, and a green sheet with the electrode pattern is thereby obtained.

Preferably, a conductor material used in manufacturing a paste for internal electrode layer is Ni, Ni alloy, or mixture thereof. The conductor material has any shape, such as spherical shape and scale shape, and may have a shape where these shapes are mixed.

Next, the green sheet with the internal electrode pattern is peeled from the carrier sheet and laminated to a desired lamination number so as to obtain a green laminated body. Incidentally, a green sheet for external layer with no internal electrode pattern is laminated at the first and last laminations.

Thereafter, the green laminated body is finally pressurized, polished as necessary, and subjected to a debinding treatment. Then, a green chip is fired under any conditions. After the firing, the green chip is subjected to an annealing treatment, polishing, and the like as necessary, and the capacitor element body 26 shown in FIG. 1 is thereby obtained.

Thereafter, the terminal electrodes 22 are formed on the capacitor element body 26. For example, the terminal electrode 22 is manufactured in a manner that a paste for terminal electrode is baked to form a base electrode, and that a metal cover film is formed on the surface of the base electrode by plating. Incidentally, the paste for terminal electrode can be prepared in the same manner as the above-mentioned paste for internal electrode layer.

When the terminal electrode 22 having a resin electrode layer is formed, for example, the base electrode consisting of a baked layer is formed on the end surface of the element body 26, and a resin electrode paste film is thereafter applied thereto, whereby the resin electrode layer is formed. After this, a Ni plating layer and a Sn plating layer are formed.

In the manufacture of the metal terminals 30, two planar metal plate materials having a predetermined size are firstly prepared. Next, the metal plate materials are machined, and the metal terminals 30 shown in FIG. 2 and FIG. 3A are thereby obtained. The metal plate materials are machined by any method, but are preferably machined by pressing. A metal cover film may be formed by plating on the surfaces of the metal terminals 30.

The material used for the plating is not limited, but is Ni, Cu, Sn etc., for example. Preferably, the thickness of the metal cover film by plating is one third or less of the thickness of the second metal 320.

The terminal electrode connection parts 32 of the metal terminals 30 are connected to the end-surface electrode parts 22a of the terminal electrodes 22 formed on both end surfaces of the chip capacitor 20 in the X-axis direction obtained in the above manner. As shown in FIG. 3A, these are connected by the solder 50 in the present embodiment.

In the present embodiment, the metal terminal 30 has the first metal 310 and the second metal 320, and the first metal 310 and the second metal 320 are arranged alternately in the Y-axis direction on the surface of the metal terminal 30 facing the end surface of the capacitor element body 26, and are connected with the end-surface electrode parts 22a by the solder 50.

In the present embodiment, the first metal 310 is a metal whose thermal expansion coefficient is smaller than a thermal expansion coefficient of the second metal 320, and a connection part between the terminal electrode 22 and the metal terminal 30 (e.g. connection part by the solder 50) thereby has an improved connection strength and a secure reliability (or durability), compared to when the metal terminal 30 is formed by only the second metal 320. In addition, the present embodiment can obtain an improvement effect on reliability, such as thermal impact.

In the present embodiment, the second metal 320 is a metal whose electric resistance is smaller than an electric resistance of the first metal 310, and the electronic device 10 thereby has an improved ESR, compared to when the metal terminal 30 is formed by only the first metal 310. In this case, the second metal 320 contributes to improvement on ESR of the electronic device 10.

Moreover, the second metal 320 is a metal whose spring constant is smaller than a spring constant of the first metal 310 and has a high vibration absorption effect, and it is thereby possible to attenuate a vibration transmitted from the capacitor element body 26 to the mounting surface 60 or a vibration transmitted reversely from the mounting surface 60 to the capacitor element body 26 at the second metal 320, and to effectively prevent acoustic noise.

In the present embodiment, it is accordingly possible to reduce ESR and prevent acoustic noise while the reliability of the connection part between the terminal electrode 22 and the metal terminal 30 is secured. To more effectively obtain the above-mentioned effects, as shown in FIG. 2, the first metal 310 and the second metal 320 are desirably exposed on the surface facing the end surface of the capacitor element body 26.

In the present embodiment, the second metal 320 extends from the terminal electrode connection part (first end) 32 of the metal terminal 30 to the mount connection part (second end) 34. In such a structure, an electric path of the second metal 320 is formed in a direction connecting between one end of the metal terminal 30 (near the terminal electrode 22) and the other end (near the mounting surface 60). Since the second metal 320 is a metal whose electric resistance is smaller than an electric resistance of the first metal 310, ESR of the electric device 10 can be reduced effectively by connecting between the capacitor element body 26 and the mounting surface 60 via the electric pass having a small electric resistance, compared to when the metal terminal 30 is formed only by the first metal 310.

In the present embodiment, at least the first metal 310 is connected with the terminal electrode 22, and the first metal 310 is a metal whose thermal expansion coefficient is smaller than a thermal expansion coefficient of the second metal 320. Thus, the metal terminal 30 and the terminal electrode 22 are further strongly connected, compared to when the metal terminal 30 is formed only by the second metal 320. That is, the reliability of the connection part between the terminal electrode 22 and the metal terminal 30 can be secured sufficiently.

In the present embodiment, a pair of first metals 310 is particularly connected with the terminal electrodes 22 on both sides of the second metals 320 in the Y-axis direction, and the connection parts are thereby more stable and more reliable.

(Second Embodiment)

Figure 4:
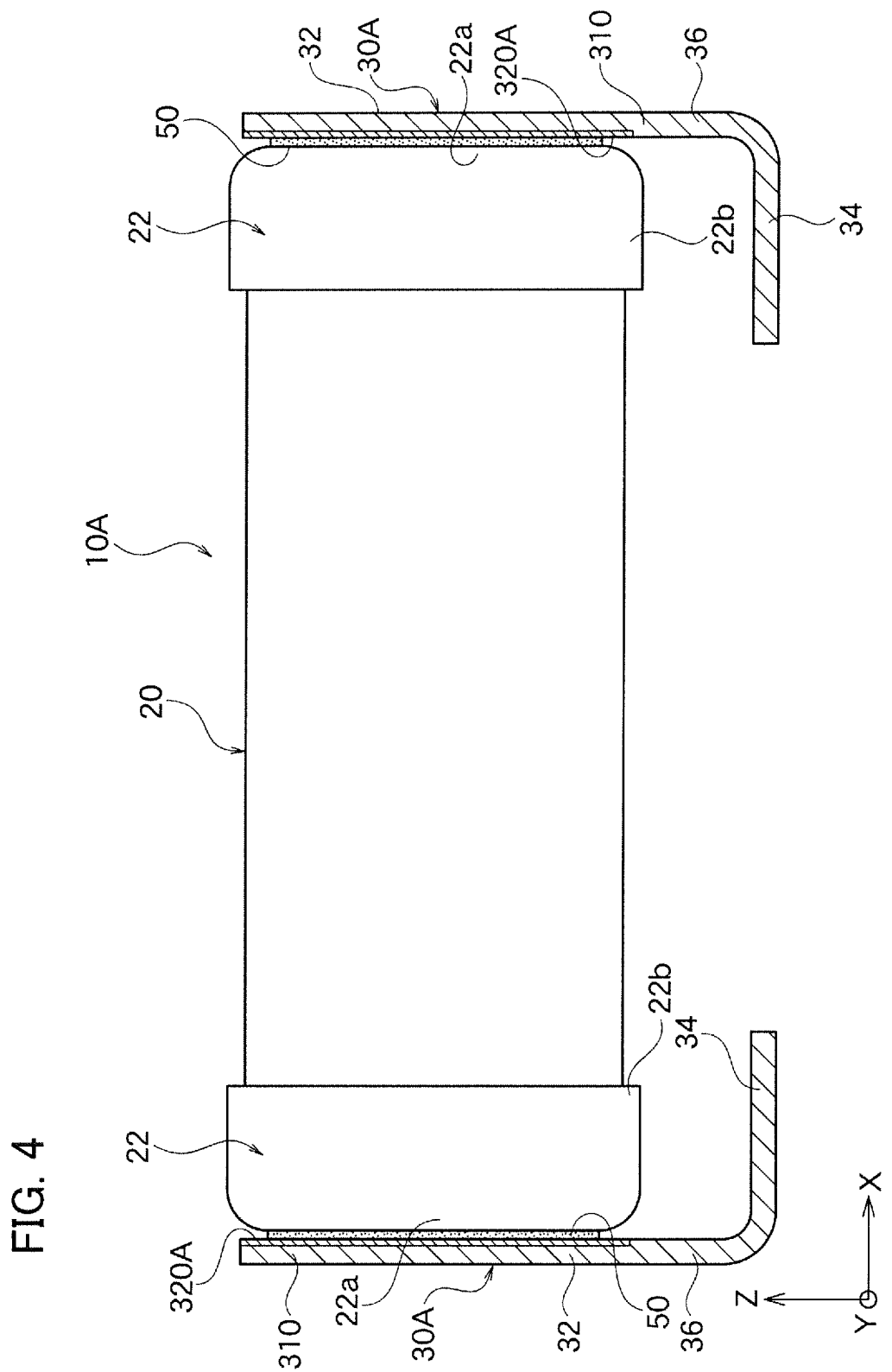
FIG. 4 is a schematic cross-sectional view of a main part of an electronic device according to another embodiment of the present invention.

FIG. 4 is a perspective view of an electronic device 10A according to Second Embodiment of the present invention. The electronic device 10A according to the present embodiment has the same structure and demonstrates the same effect as the electronic device 10 according to First Embodiment shown in FIG. 1 to FIG. 3A except for the following description. Thus, common members are provided with common parts numbers and are not described.

In the present embodiment, as shown in FIG. 4, a second metal 320A is formed only on a part of a metal terminal 30A corresponding to the terminal electrode connection part 32, and the mount connection part 34 and the coupled part 36 are formed by only the first metal 310. The other structure is similar to the above-mentioned embodiment, and similar effects are demonstrated.

(Third Embodiment)

Figure 5A:
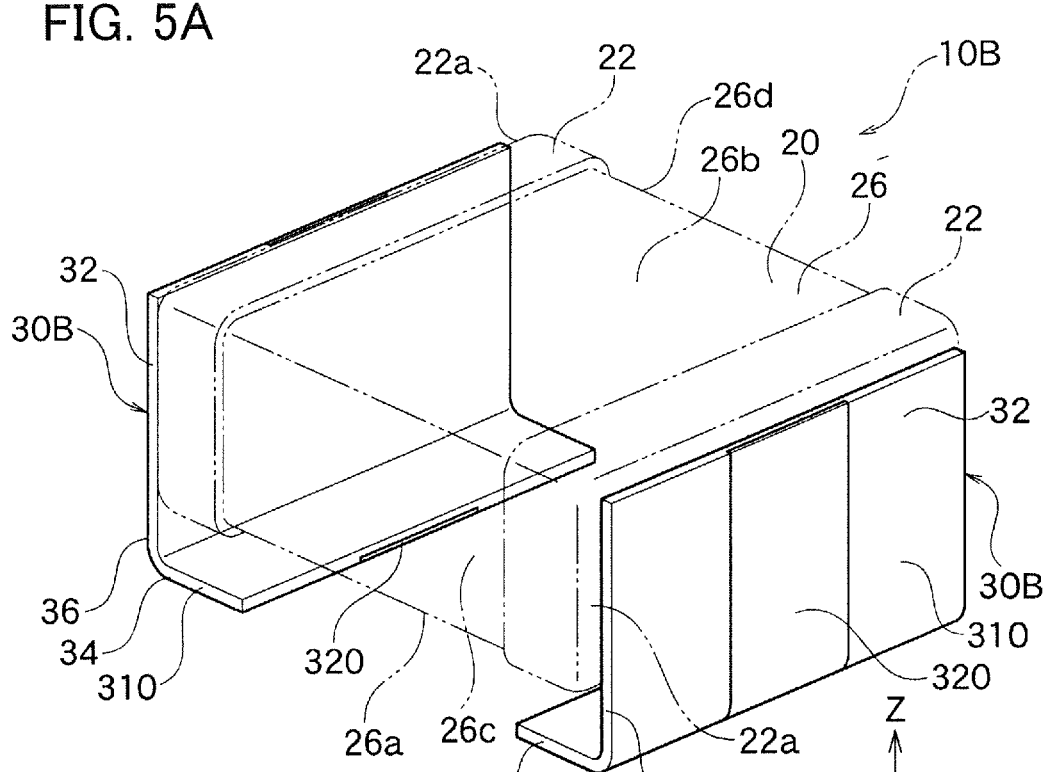
FIG. 5A is a perspective view of an electronic device according to further another embodiment of the present invention.
Figure 5B:
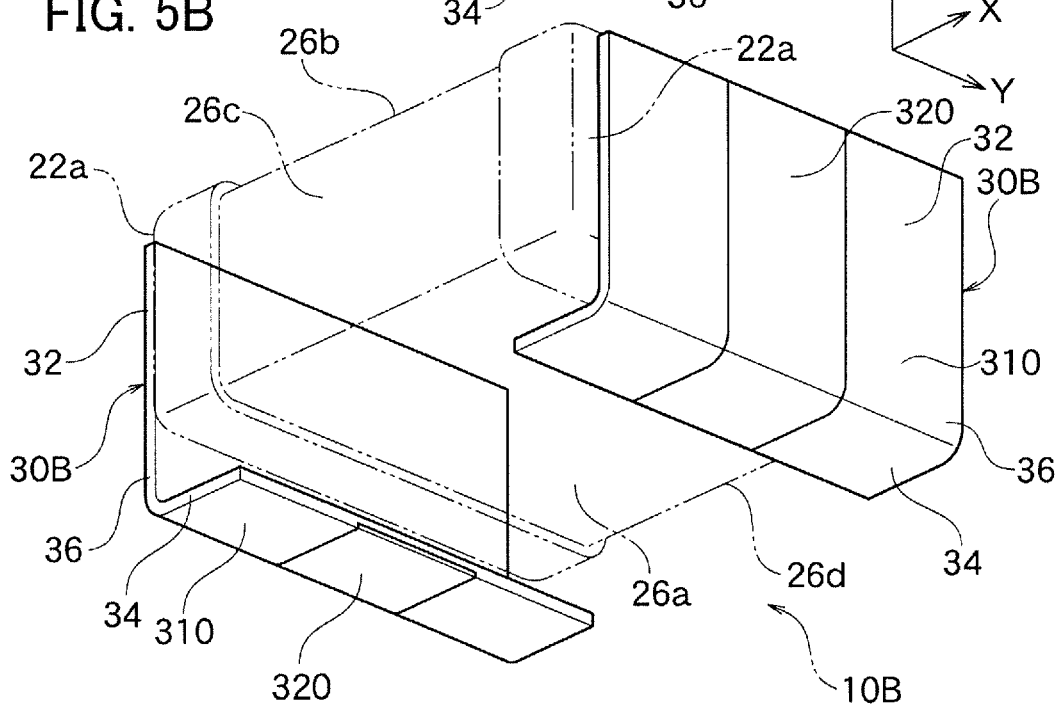
FIG. 5B is a perspective view of the electronic device shown in FIG. 5A when seen from a different angle.

FIG. 5A and FIG. 5B are a perspective view of an electronic device 10B according to Third Embodiment of the present invention. The electronic device 10B according to the present embodiment has similar structure and effects to the electronic device 10 according to First Embodiment shown in FIG. 1 to FIG. 3A except for the following description. Thus, common members are provided with common parts numbers and are not described.

In the present embodiment, as shown in FIG. 5A and FIG. 5B, a metal terminal 30B has a first metal 310 and a second metal 320, and the first metal 310 and the second metal 320 are alternately exposed on a surface of the metal terminal 30B (outward in the Y-axis direction) opposite to its surface facing the end surface of the capacitor element body 26. Incidentally, only the first metal 310 is exposed on the surface of the metal terminal 30B facing the end surface of the capacitor element body 26, and only the first metal 310 is directly connected with the terminal electrode 22. The other structure is similar to the above-mentioned embodiments.

The present embodiment can also obtain similar effects to the above-mentioned embodiments. In the present embodiment, the first metal 310 can particularly be in contact with the whole of the end-surface electrode part 22a of the terminal electrode 22, and it is thereby possible to reduce a stress at a connection part (e.g. connection part by the solder 50) between the terminal electrode 22 and the metal terminal 30B, to further improve a connection strength of the connection part, and to sufficiently secure the reliability of the connection part between the terminal electrode 22 and the metal terminal 30.

(Fourth Embodiment)

Figure 6B:
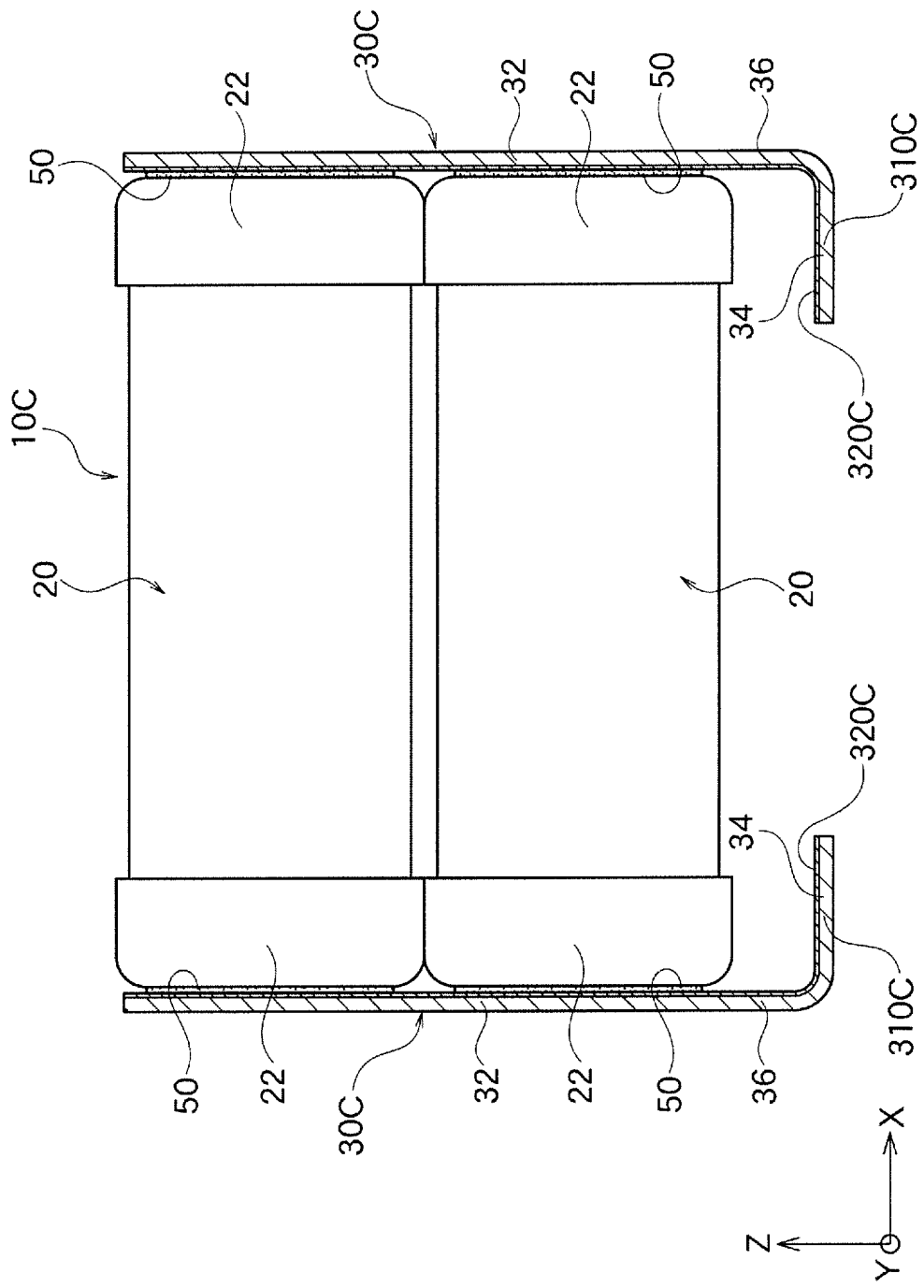
FIG. 6B is a schematic cross-sectional view of a main part of the electronic device shown in FIG. 6A.

As shown in FIG. 6A and FIG. 6B, an electronic device 10C according to Fourth Embodiment of the present invention has similar structure and effects to the electronic device 10 according to First Embodiment shown in FIG. 1 to FIG. 3A except for the following description. Thus, common members are provided with common parts numbers and are not described.

In the present embodiment, as shown in FIG. 6A and FIG. 6B, metal terminals 30C (first metal 310C and second metal 320C) arranged on both ends in the X-axis direction are comparatively high in the Z-axis direction. The terminal electrode connection parts 32 are connectable by the solders 50 with each of the terminal electrodes 22 of two or more chip capacitors 20 arranged next to each other in the Z-axis direction. In FIG. 6B, the solders 50 on each terminal electrode 22 are formed discontinuously in the Z-axis direction, but may be formed continuously in the Z-axis direction.

The electronic device 10C of the present embodiment has similar structure and effects to the electronic device 10 of First Embodiment except that the chip capacitors 20 are arranged next to each other in the Z-axis direction.

(Fifth Embodiment)

Figure 7A:
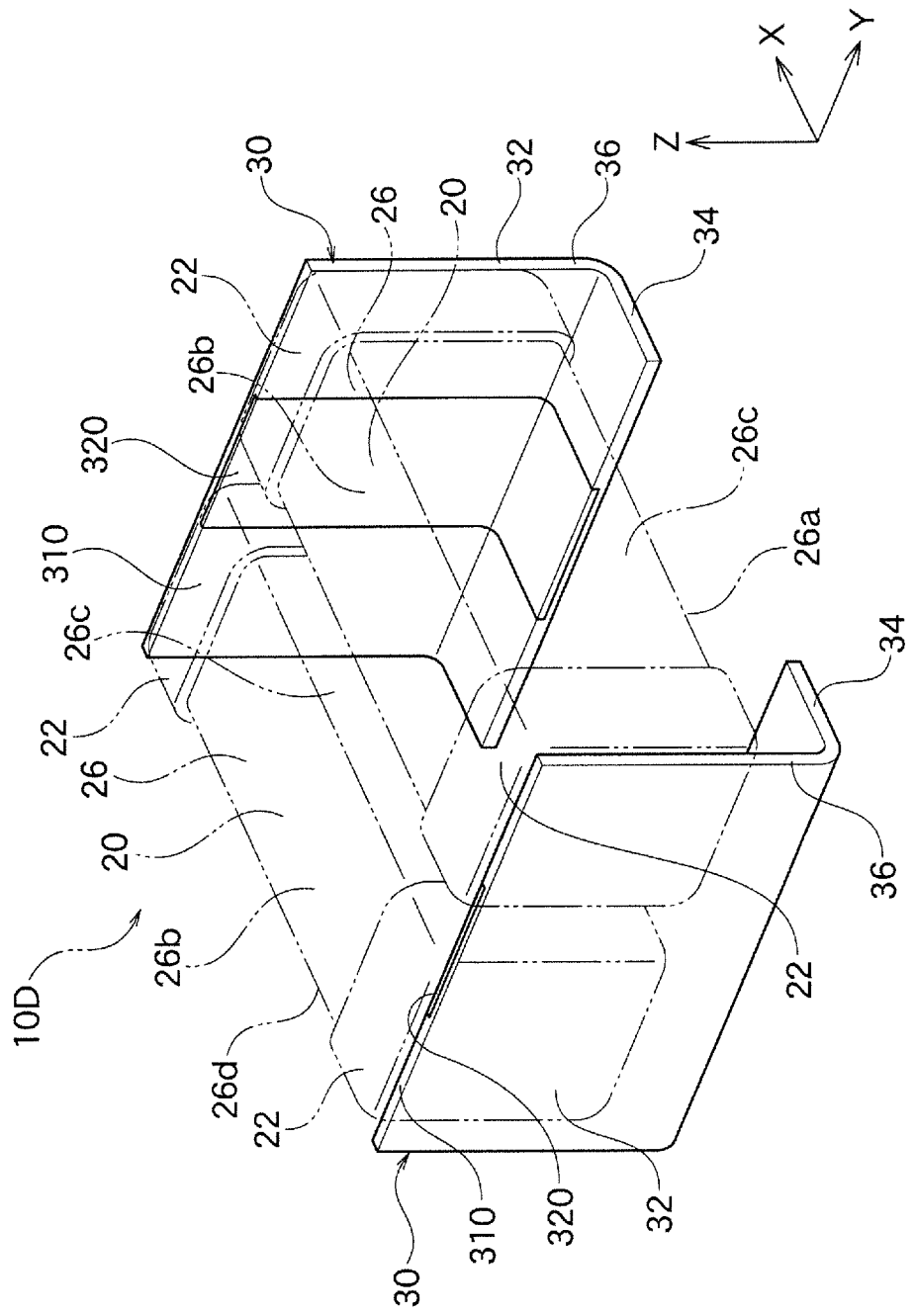
FIG. 7A is a perspective view of an electronic device according to further another embodiment of the present invention.

FIG. 7A is a perspective view of an electronic device 10D according to Fifth Embodiment of the present invention. The electronic device 10D according to the present invention has similar structure and effects to the electronic device 10 according to First Embodiment shown in FIG. 1 to FIG. 3A except for the following description. Thus, common members are provided with common parts numbers and are not described.

In the present embodiment, as shown in FIG. 7A, the terminal electrode connection parts 32 are connected by the solders 50 (not shown) with each of the terminal electrodes 22 of two or more chip capacitors 20 arranged next to each other in the Y-axis direction.

In the present embodiment, both of the first metal 310 and the second metal 320 are in contact with the terminal electrode 22 of each chip capacitor 20. That is, the terminal electrode 22 of each chip capacitor 20 is connected with the metal terminal 30 by bridging the first metal 310 and the second metal 320.

The electronic device 10D according to the present embodiment has similar structure and effects to the electronic device 10 according to First Embodiment except that the chip capacitors 20 are arranged next to each other in the Y-axis direction.

Figure 7B:
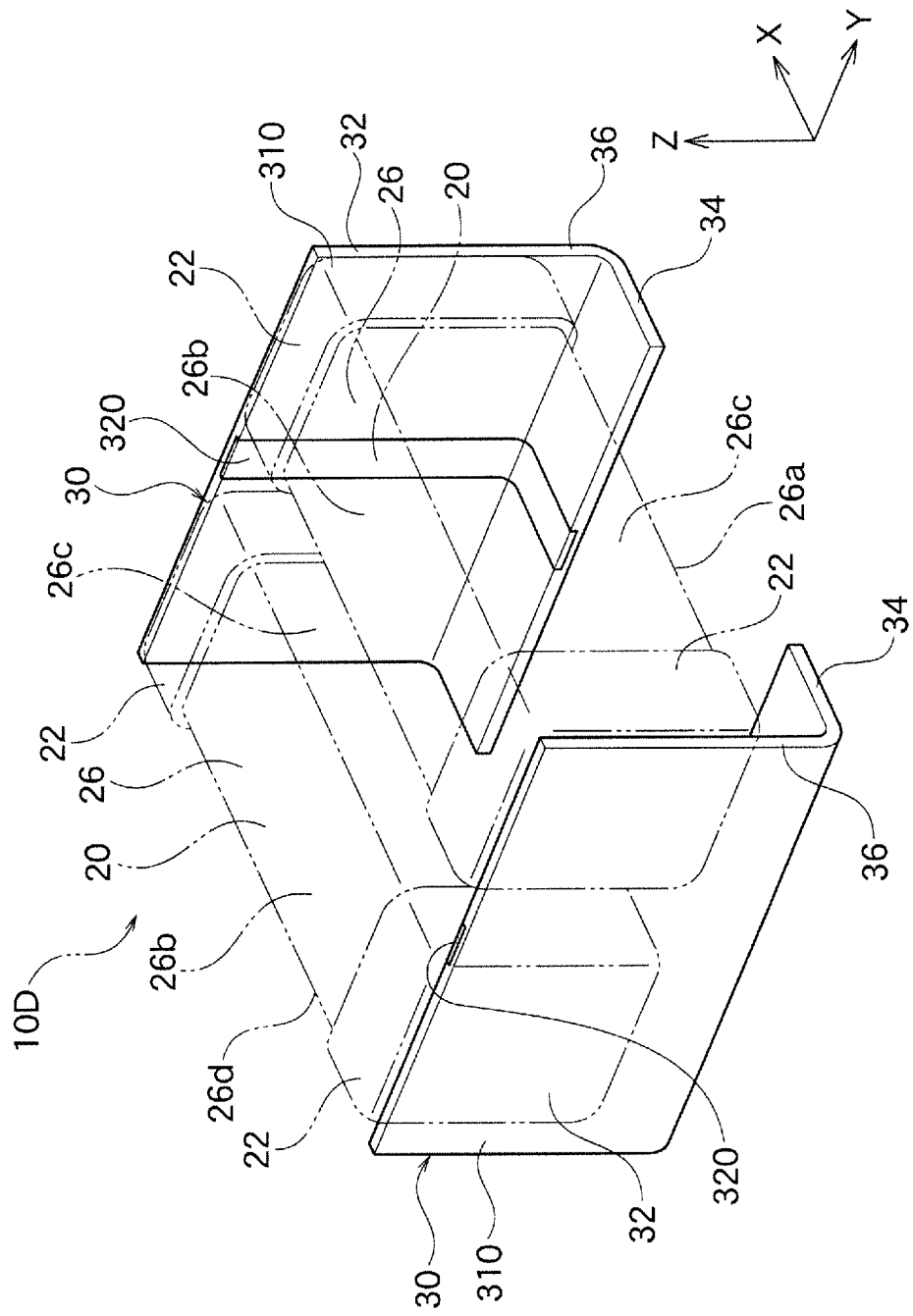
FIG. 7B is a perspective view of a modified example of the electronic device shown in FIG. 7A.

Incidentally, as shown in FIG. 7B, the width of the second metal 320 (width in the Y-axis direction) may be smaller than the width of the second metal 320 shown in FIG. 7A. In such a structure, only the first metal 310 is connectable with the terminal electrode 22 of each chip capacitor 20, and similar effects to Third Embodiment mentioned above are obtained in each chip capacitor 20.

(Sixth Embodiment)

Figure 8:
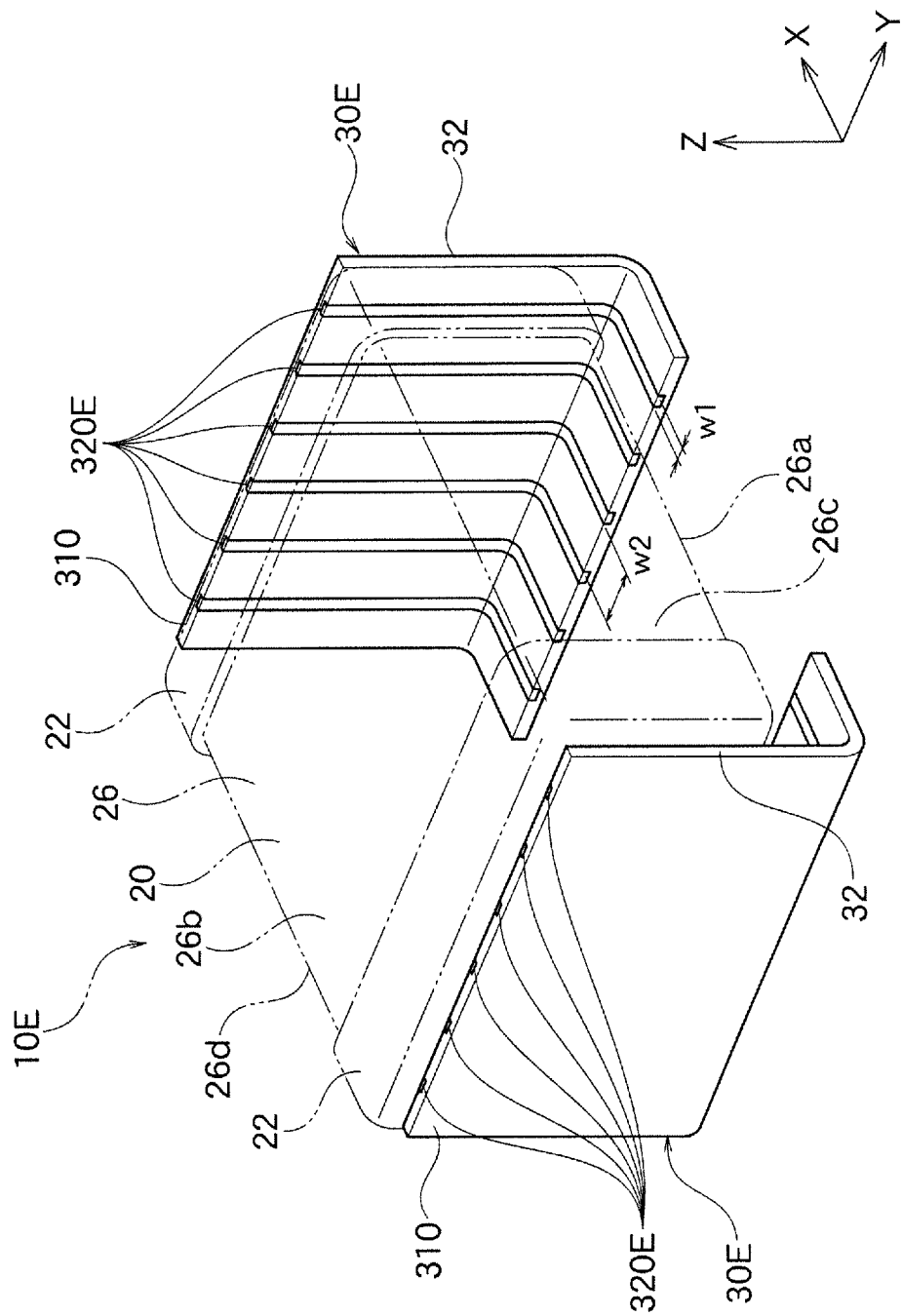
FIG. 8 is a perspective view of an electronic device according to further another embodiment of the present invention.

FIG. 8 is a perspective view of an electronic device 10E according to Sixth Embodiment of the present invention. The electronic device 10E according to the present invention has similar structure and effects to the electronic device 10 according to First Embodiment shown in FIG. 1 to FIG. 3A except for the following description. Thus, common members are provided with common parts numbers and are not described.

A metal terminal 30E according to the present embodiment has a first metal 310 and a plurality (six in the illustrated example) of second metals 320E, and the first metal 310 and the plurality of second metals 320E are alternately exposed in the Y-axis direction and connected with the terminal electrode 22 on a surface of the metal terminal 30E facing an end surface of the capacitor element body 26. Incidentally, only the first metal 310 is exposed on the opposite surface to the surface of the metal terminal 30E facing the end surface of the capacitor element body 26.

Each of the second metals 320E has a width (width in the Y-axis direction) that is smaller than that of the second metal 320 according to First Embodiment, and is arranged (embedded) in the first metal 310 in the Y-axis direction with predetermined intervals. The other structure is similar to the above-mentioned embodiments.

The present embodiment also has effects similar to those of the above-mentioned embodiments. In the present embodiment, the first metal 310 and the second metals 320E are repeatedly alternately connected with the terminal electrode 22 at the connection part between the metal terminal 30E and the terminal electrode 22 of the chip capacitor 20, and the connection part is thereby more stably connectable and is more reliable. The connection strength or the adjustment of ESR becomes easy only by changing a ratio of w1/w2, where w1 is an exposure width of the second metal 320E in the Y-axis direction, and w2 is an exposure width of the first metal 310 in the Y-axis direction. Moreover, the metal terminal 30E is prevented from warping only by employing a feature where the second metals 320E and the first metal 310 are (Seventh Embodiment)

Figure 9:
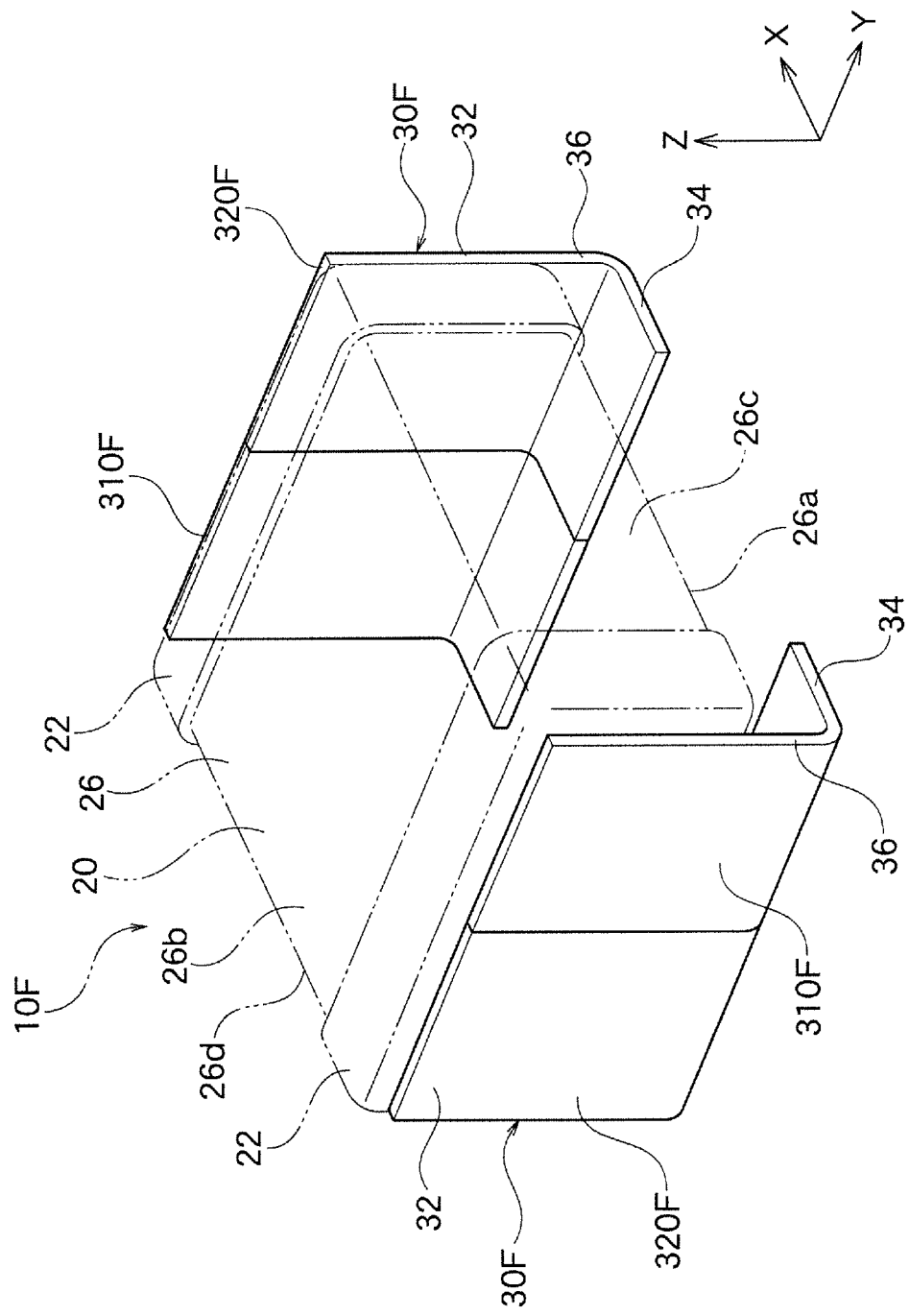
FIG. 9 is a perspective view of an electronic device according to further another embodiment of the present invention.

FIG. 9 is a perspective view of an electronic device 10F according to Seventh Embodiment of the present invention. The electronic device 10F according to Seventh Embodiment of the present invention has similar structure and effects to the electronic device 10 according to First Embodiment shown in FIG. 1 to FIG. 3A except for the following description. Thus, common members are provided with common parts numbers and are not described.

The metal terminal 30F according to the present embodiment has a first metal 310F and a second metal 320F with the same shape and the same size. The first metal 310F and the second metal 320F are arranged and connected next to each other in the Y-axis direction, and are exposed next to each other in the Y-axis direction on a surface of the metal terminal 30F facing an end surface of the capacitor element body 26 and on its opposite surface.

As shown in FIG. 9, one ends of the metals 310F and 320F are connected, and the metals 310F and 320F are arranged next to each other in the Y-axis direction. The other structure is similar to the above-mentioned embodiments. In the present embodiment, the metals 310F and 320F do not necessarily have the same width in the Y-axis direction, and may have different widths in the Y-axis direction. In the embodiment shown in FIG. 9, the metal terminal 30F is formed by a pair of metals 310F and 320F, but three or more metals may be connected to each other in the Y-axis direction, or two or more metals may be connected to each other in the direction from the terminal electrode connection part 32 to the mount connection part 34.

(Eighth Embodiment)

Figure 10:
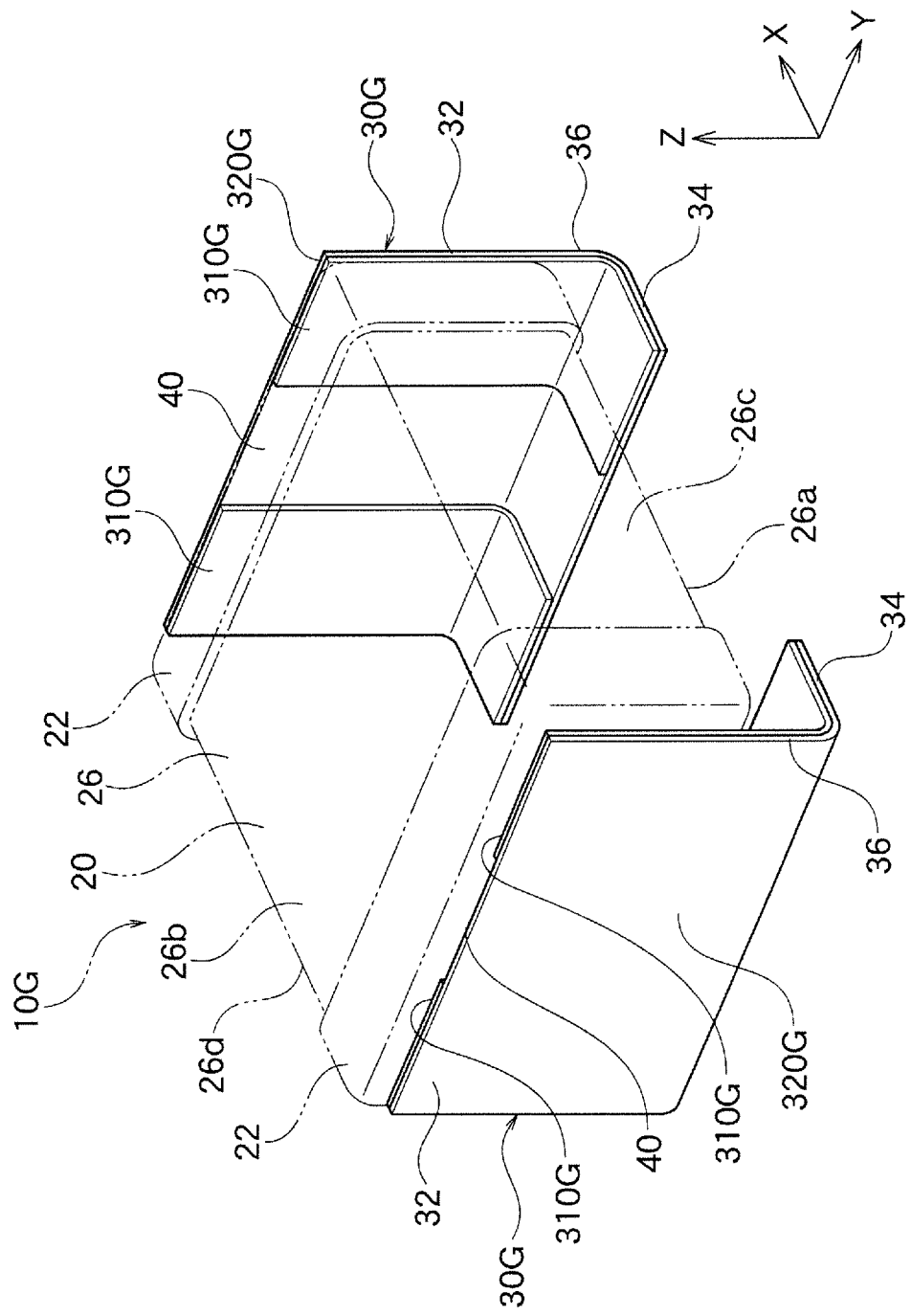
FIG. 10 is a perspective view of an electronic device according to further another embodiment of the present invention.

FIG. 10 is a perspective view of an electronic device 10G according to Eighth Embodiment of the present invention. The electronic device 10G according to the present invention has similar structure and effects to the electronic device 10 according to First Embodiment shown in FIG. 1 to FIG. 3A except for the following description. Thus, common members are provided with common parts numbers and are not described.

The metal terminal 30G of the present embodiment has a second metal 320G and a plurality (two in the illustrated example) of first metals 310G The metals 310G and 320G are exposed in the Y-axis direction on a surface of the metal terminal 30G facing an end surface of the capacitor element body 26. Incidentally, only the second metal 320G is exposed on the opposite surface to the surface of the metal terminal 30G facing the end surface of the capacitor element body 26.

In the present embodiment, as shown in FIG. 10, each of the first metals 310G is arranged on the surface of the second metal 320G facing the end surface of the capacitor element body 26. Then, a groove 40 whose depth is equal to the thickness of the first metal 310G is formed between the pair of first metals 310G (in the Y-axis direction). The other structure is similar to the above-mentioned embodiments.

The present embodiment also has effects similar to those of the above-mentioned embodiments. In the present embodiment, a connection member, such as solder 50, is filled in the groove 40 in connecting the metal terminal 30G to the terminal electrode 22 of the chip capacitor 20, and the metal terminal 30G is firmly connected with the terminal electrode 22 via the solder 50. That is, the groove 40 between the first metal 310G and the first metal 310G functions as a solder sump, and the metal terminals 30G are firmly connected with the terminal electrode 22. The amount of the solder 50 filled in the groove 40 may be controlled by adjusting the thickness of the second metal 320G and adjusting the depth of the groove 40.

In the present embodiment, a pair of first metal 310G is directly connected with the terminal electrode 22 by the connection member, such as solder, and the second metal 320G is connected with the terminal electrode 22 by the first metal 310 or by the connection member, such as solder, existing in the groove 40. The first metal 310G is not limited to one pair, and may be three or more pairs. In this case, a gap 40 is formed between the first metals 310G In the present embodiment, two or more first metals 310G may be arranged next to each other in the direction from the terminal electrode connection part 32 to the mount connection part 34. The first metal and the second metal may be replaceable with each other. This is the case with the other embodiments.

(Ninth Embodiment)

Figure 11:
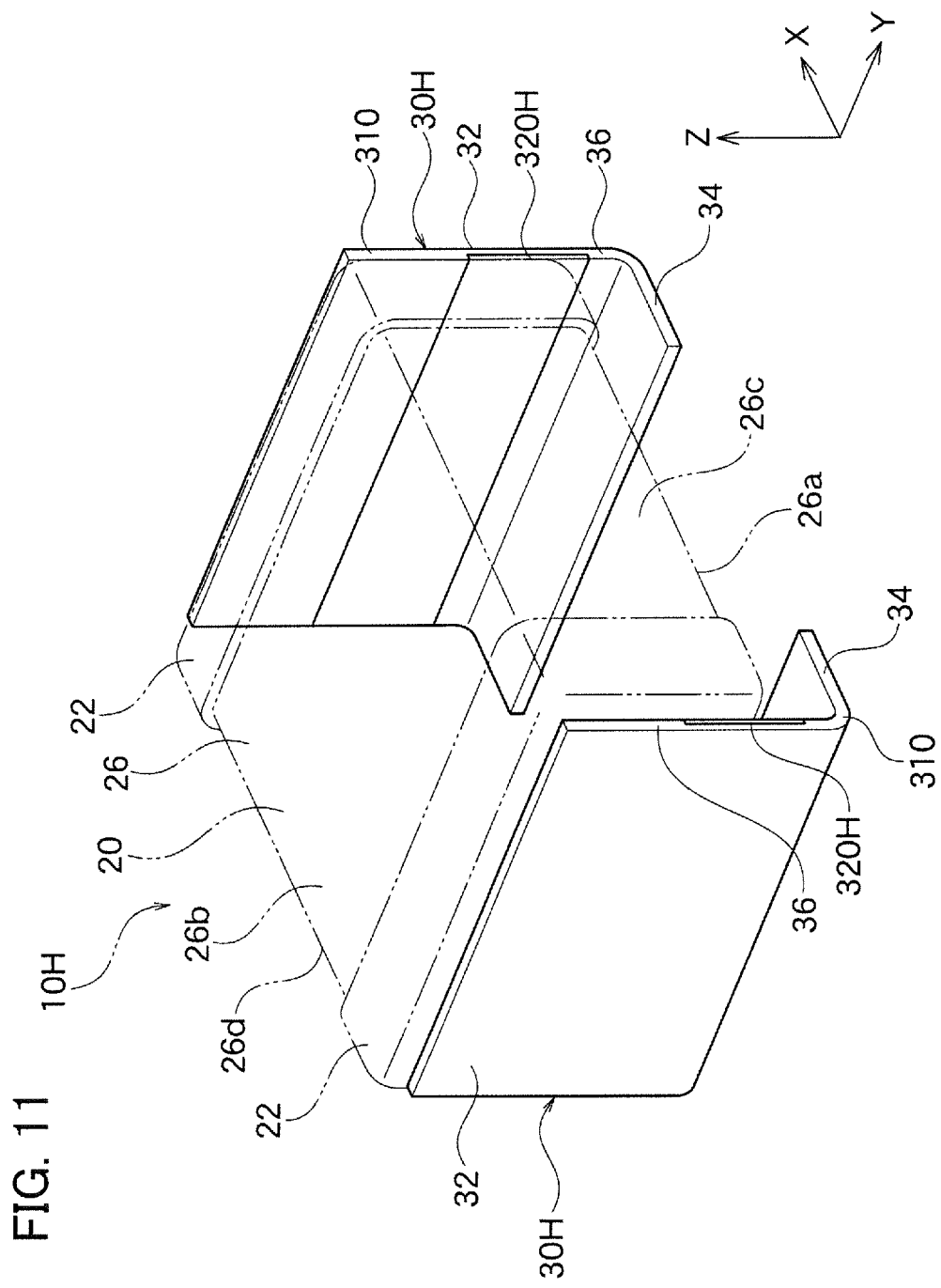
FIG. 11 is a perspective view of an electronic device according to further another embodiment of the present invention.

FIG. 11 is a perspective view of an electronic device 10H according to Ninth Embodiment of the present invention. The electronic device 10H according to the present invention has similar structure and effects to the electronic device 10 according to First Embodiment shown in FIG. 1 to FIG. 3A except for the following description. Thus, common members are provided with common parts numbers and are not described.

The metal terminal 30H of the present embodiment has a first metal 310 and a second metal 320H whose width (width in the Y-axis direction) is the same as that of the first metal 310, and the metals 310 and 320H are exposed on a surface of the metal terminal 30H facing an end surface of the capacitor element body 26. Incidentally, only the first metal 310 is exposed on the opposite surface to the surface of the metal terminal 30H facing the end surface of the capacitor element body 26.

In the present embodiment, as shown in FIG. 11, the first metal 310 and the second metal 320H are alternately exposed on the surface of the metal terminal 30H near the terminal electrode 22 in the direction from the terminal electrode connection part 32 to the mount connection part 34 of the metal terminal 30H. In the present embodiment, both of the first metal 310 and the second metal 320H are connected with the terminal electrode 22 at the terminal electrode connection part 32. The second metal 320H has a part that is directly connected with the terminal electrode 22 and a part that is not directly connected with the terminal electrode 22, toward the mount connection part 34 of the metal terminal 30H. The other structure is similar to the above-mentioned embodiments.

The present embodiment also has effects similar to those of the above-mentioned embodiments. In the present embodiment, the second metal 320H extends in the Y-axis direction, which crosses the direction from the terminal electrode connection part 32 to the mount connection part 34. Thus, a vibration transmitted from the capacitor element body 26 to the mounting surface 60 or a vibration transmitted reversely from the mounting surface 60 to the capacitor element body 26 inevitably goes through the second metal 320H. In addition, the second metal 320H has both a part that is directly connected with the terminal electrode 22 and a part that is not directly connected with the terminal electrode 22.

The second metal 320H is formed by a metal whose spring constant is smaller than a spring constant of the first metal 310, and has a vibration absorption effect that is higher than a vibration absorption effect of the first metal 310. Thus, the above-mentioned vibration can be attenuated in the second metal 320H, and acoustic noise can be prevented effectively.

In the example shown in FIG. 11, the second metal 320H is formed in the terminal electrode connection part 32, but may be formed in the mount connection part 34. Even in this case, a vibration transmitted from the mounting surface 60 to the capacitor element body 26 can be attenuated effectively in the second metal 320H, and the prevention effect on acoustic noise can be improved.

(Tenth Embodiment)

Figure 12:
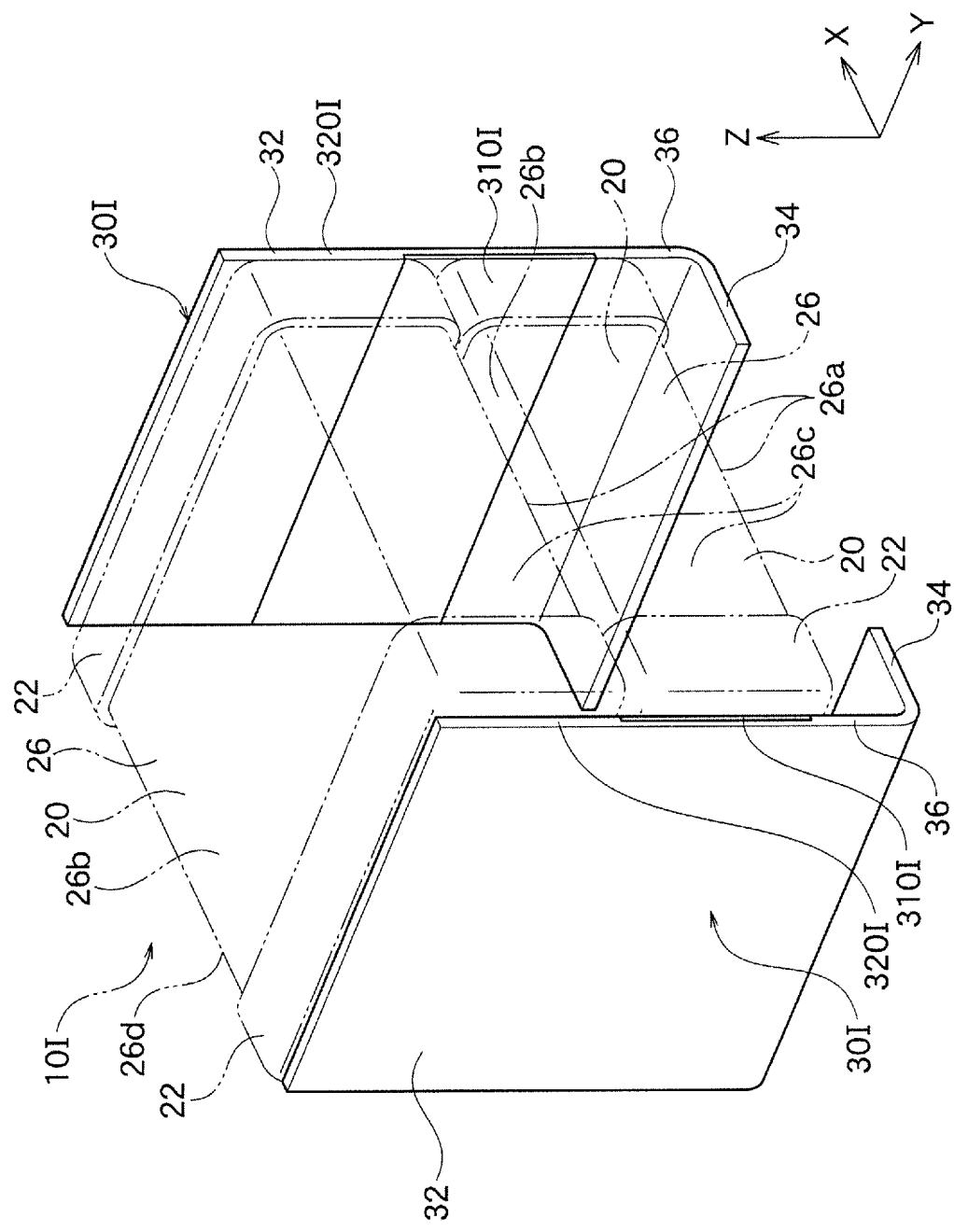
FIG. 12 is a perspective view of an electronic device according to further another embodiment of the present invention.

FIG. 12 is a perspective view of an electronic device 10I according to Tenth Embodiment of the present invention. The electronic device 10I according to the present invention has similar structure and effects to the electronic device 10H according to Ninth Embodiment shown in FIG. 11 except for the following description. Thus, common members are provided with common parts numbers and are not described.

In the present embodiment, as shown in FIG. 12, metal terminals 30I (first metal 310I and second metal 320I) arranged on both ends in the X-axis direction are high in the Z-axis direction, and two or more terminal electrodes 22 of the chip capacitors 20 arranged next to each other in the Z-axis direction are connected with the terminal electrode connection parts 32 by solder (not shown).

The electronic device 10I of the present embodiment has similar structure and effects to the electronic device 10H of Ninth Embodiment except that the chip capacitors 20 are arranged next to each other in the Z-axis direction.

(Eleventh Embodiment)

Figure 13:
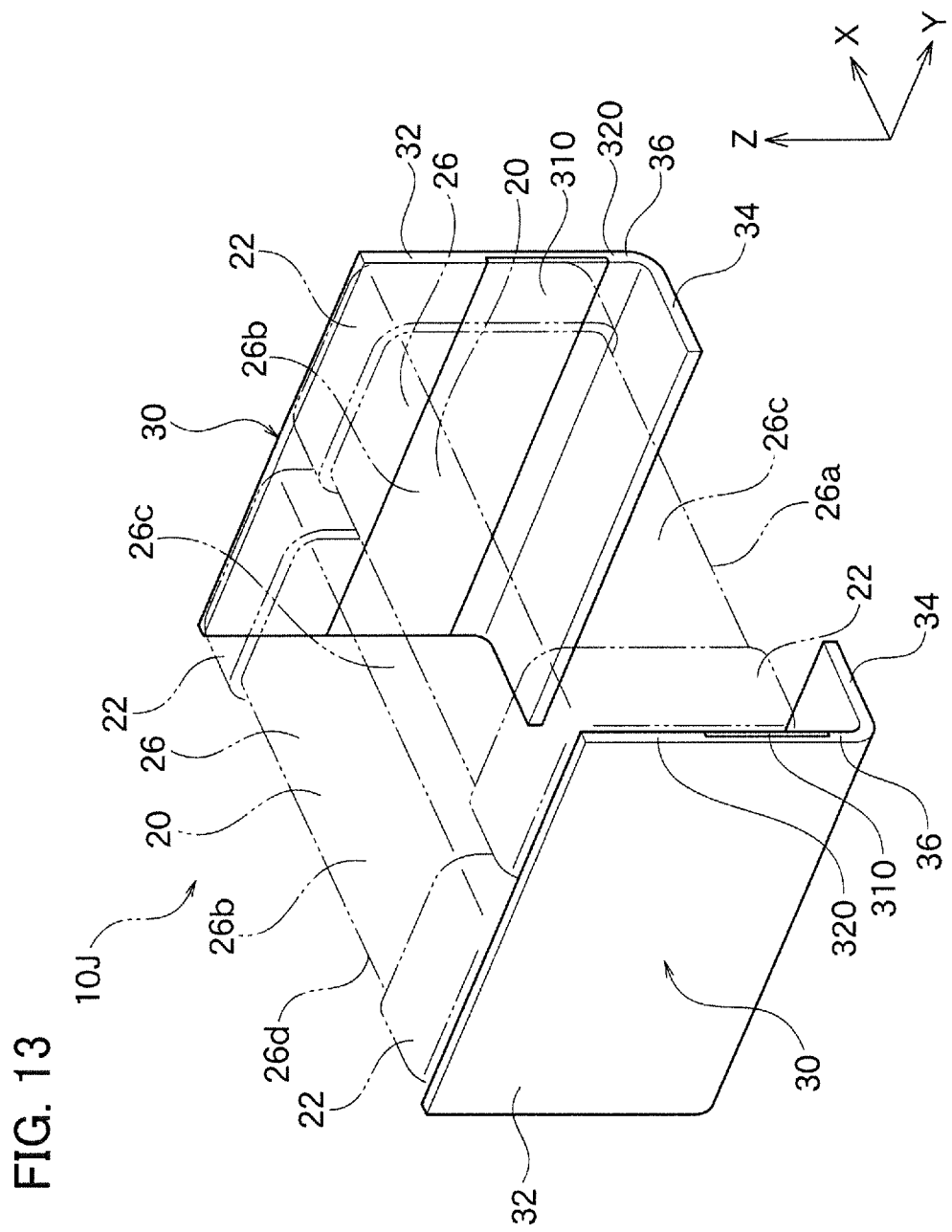
FIG. 13 is a perspective view of an electronic device according to further another embodiment of the present invention.

FIG. 13 is a perspective view of an electronic device 10J according to Eleventh Embodiment of the present invention. The electronic device 10J according to the present invention has similar structure and effects to the electronic device 10H according to Ninth Embodiment shown in FIG. 11 except for the following description. Thus, common members are provided with common parts numbers and are not described.

In the present embodiment, as shown in FIG. 13, two or more terminal electrodes 22 of the chip capacitors 20 arranged next to each other in the Y-axis direction are connected with the terminal electrode connection parts 32 by solder (not shown).

The electronic device 10J of the present embodiment has similar structure and effects to the electronic device 10I of Tenth Embodiment except that the chip capacitors 20 are arranged next to each other in the Y-axis direction.

(Other Embodiments)

Incidentally, the present invention is not limited to the above-mentioned embodiments, and may variously be changed within the scope of the present invention. In the above-mentioned embodiments, for example, the terminal electrode 22 and the metal terminal 30, 30A to 30C, or 30E to 30I are connected by the solder 50, but may be connected by a conductive adhesive or another connection means.

In the above-mentioned embodiments, the metal terminal is formed by combining two different metals, but may be formed by combining three or more different metals.

In the above-mentioned embodiments, the first metal and the second metal may function reversely. In First Embodiment shown in FIG. 1 to FIG. 3B, for example, the first metal 310 may be a copper-based metal, and the second metal 320 may be an iron-based metal. In such a structure, a large area of the first metal 310 formed by a copper-based metal is formed continuously from the terminal electrode connection part 32 to the mount connection part 34 on both sides of the second metal 320 of the metal terminal 30 in the Y-axis direction, and the improvement effect on ESR can be further enhanced.

In the above-mentioned embodiments, the first metal 310 is an iron-based metal and the second metal 320 is a copper-based metal, but are not limited to these metals.

FIG. 2, FIG. 3A, and the like describe the second metal 320 having an approximately rectangular shape and bent into an L shape, but may have any shape. For example, the second metal 320 may be a metal having a shape of triangle, ellipse, or another polygon. The position and size of the second metal 320 may appropriately be changed. Moreover, the size of the chip capacitor 20 may also appropriately be changed.

In First Embodiment, the metal terminal 30 may be provided with engagement arm portions configured to hold the terminal electrode 22 of the chip capacitor 20 (for example, see the engagement arm portion disclosed in JP 2014-146642 A). This is the case with the other embodiments.

In such a structure, the metal terminal 30 and the chip capacitor 20 are fixed, and the conduction between the chip capacitor 20 and the metal terminal 30 is secured at the same time. Thus, the electronic device is manufactured easily, compared to when the metal terminal 30 and the chip capacitor 20 are connected using the solder 50, an adhesive, or the like.

Since the metal terminal 30 and the chip capacitor 20 are fixed by the engagement arm portions holding the terminal electrode 22 of the chip capacitor 20, the fixity between the metal terminal 30 and the chip capacitor 20 has no risk of being released due to the heat transmitted to the connection part in mounting the electronic device. Moreover, there is no need to use a high-temperature solder or so for the connection between the metal terminal 30 and the chip capacitor 20, and it is thereby possible to avoid using a material with environmental load.

The above-mentioned embodiments describe an electronic device having one or two chip capacitors 20, but the electronic device of the present invention may have three or more chip capacitors 20.

NUMERICAL REFERENCES

2 . . . dielectric layer
4 . . . internal electrode layer
10, 10A, 10B, 10C, 10D, 10E, 10F, 10G, 10H, 10I, 10J . . . electronic device
20 . . . chip capacitor
22 . . . terminal electrode
22a . . . end-surface electrode part
22b . . . side-surface electrode part
26 . . . element body
26a . . . bottom side surface
26b . . . top side surface
20c . . . side surface
20d . . . side surface
30, 30A, 30B, 30C, 30E, 30F, 30G, 30H, 30I . . . metal terminal
310, 310C, 310F, 310G, 310I . . . first metal
320, 320A, 320C, 320E, 320F, 310G, 320H, 320I . . . second metal
32 . . . terminal electrode connection part
34 . . . mount connection part
36 . . . coupled part
40 . . . groove
50 . . . solder
60 . . . mounting surface

The invention claimed is:

1. An electronic device, comprising:
a chip component including a terminal electrode formed on an end surface of a ceramic element body containing an internal electrode; and
an external terminal including a first end electrically connected with the terminal electrode and a second end disposed opposite to the first end and connected with a mounting surface,
wherein:
the external terminal comprises:
a first metal; and
a second metal different from the first metal;
the first metal and the second metal are arranged next to each other in a surface direction of the external terminal and alternately exposed on a surface of the external terminal; and
a width of the second metal exposed to the surface of the external terminal is 1/10 to 9/10 of the width of the terminal electrode.

2. The electronic device according to claim 1, wherein the first metal and the second metal are alternately exposed on a surface facing the end surface of the ceramic element body.

3. The electronic device according to claim 1, wherein the second metal extends in a direction from the first end to the second end of the external terminal.

4. The electronic device according to claim 1, wherein the second metal extends in a perpendicular direction to a direction from the first end to the second end of the external terminal.

5. The electronic device according to claim 1,
wherein a thermal expansion coefficient of the first metal is smaller than that of the second metal, and
the terminal electrode is connected with at least the first metal of the external terminal.

6. The electronic device according to claim 1, wherein an electric resistance of the second metal is lower than that of the first metal.

7. The electronic device according to claim 1, wherein a spring constant of the second metal is lower than that of the first metal.

8. The electronic device according to claim 1, wherein the external terminal comprises:
a terminal electrode connection part disposed to face the terminal electrode; and
a mount connection part connectable with the mounting surface, and
wherein the first metal and the second metal are formed over the terminal electrode connection part and the mount connection part.

9. The electronic device according to claim 1, wherein
the first end of the external terminal has a surface that faces and is parallel with the end surface of the ceramic body; and
the first metal and the second metal are alternatively exposed on the surface of the first end of the external terminal.

10. The electronic device according to claim 1, wherein
the first end of the external terminal has a surface that faces and is parallel with the end surface of the ceramic body; and
the surface of the first end of the external terminal includes a first region in which the first metal is exposed and a second region in which the second metal is exposed, the first region and the second region being alternatively arranged on the surface of the first end of the external terminal.

11. The electronic device according to claim 1, wherein
a cover film is formed on the surface of the external terminal.

12. An electronic device, comprising:
a chip component including a terminal electrode formed on an end surface of a ceramic element body containing an internal electrode; and
an external terminal including a first end electrically connected with the terminal electrode and a second end disposed opposite to the first end and connected with a mounting surface, wherein:
the external terminal comprises:
a first metal; and
a second metal different from the first metal;
the first metal and the second metal are arranged next to each other in a surface direction of the external terminal and alternately exposed on a surface of the external terminal;
the first metal is an iron-based metal; and
the second metal is a copper-based metal.

13. The electronic device according to claim 12, wherein
a cover film is formed on the surface of the external terminal.

* * * * *